(12) United States Patent
Li et al.

(10) Patent No.: US 11,942,595 B2
(45) Date of Patent: Mar. 26, 2024

(54) SEASONAL ENERGY STORAGE TECHNOLOGIES BASED ON RECHARGEABLE BATTERIES

(71) Applicant: Battelle Memorial Institute, Richland, WA (US)

(72) Inventors: Guosheng Li, Richland, WA (US); Vincent L. Sprenkle, Richland, WA (US); Minyuan M. Li, Richland, WA (US); David M. Reed, Richland, WA (US); Evgueni Polikarpov, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 37 days.

(21) Appl. No.: 17/330,305

(22) Filed: May 25, 2021

(65) Prior Publication Data
US 2022/0393230 A1 Dec. 8, 2022

(51) Int. Cl.
*H01M 10/0561* (2010.01)
*H01M 4/02* (2006.01)
(Continued)

(52) U.S. Cl.
CPC ....... *H01M 10/0561* (2013.01); *H01M 4/134* (2013.01); *H01M 10/443* (2013.01);
(Continued)

(58) Field of Classification Search
CPC ............. H01M 10/0561; H01M 4/134; H01M 10/443; H01M 2004/028; H01M 2300/0057
See application file for complete search history.

(56) References Cited

U.S. PATENT DOCUMENTS

| 4,189,827 A | * | 2/1980 | Eberhart | H01M 6/36 427/193 |
| 4,797,333 A | * | 1/1989 | Coetzer | H01M 10/39 429/103 |

(Continued)

FOREIGN PATENT DOCUMENTS

| CN | 104577196 A | * | 4/2015 | .......... H01M 10/054 |
| WO | WO-2014048505 A1 | * | 4/2014 | ........ H01M 10/0525 |

OTHER PUBLICATIONS

English machine translation of Gong et al. (CN 104577196 A). (Year: 2015).*

(Continued)

*Primary Examiner* — Brian R Ohara
*Assistant Examiner* — Michelle T Leonard
(74) *Attorney, Agent, or Firm* — Klarquist Sparkman, LLP

(57) ABSTRACT

Rechargeable batteries include a $Ni_yFe_{1-y}$ cathode where $0 \leq y \leq 1$, an anode comprising a current collector, a porous separator positioned between the cathode and the anode, and an electrolyte comprising $MAlX_4$, wherein M is Na, Li, K, or a combination thereof, and X is Cl, Br, I, or a combination thereof, and wherein the electrolyte is a solid at temperatures less than 50° C. The batteries are temperature activated. The electrolyte temperature is increased above its melting point while charging and reduced below the melting point for energy storage, such as seasonal energy storage. The electrolyte temperature is increased above the melting point again to discharge the battery.

16 Claims, 14 Drawing Sheets
(13 of 14 Drawing Sheet(s) Filed in Color)

(51) Int. Cl.
*H01M 4/134* (2010.01)
*H01M 10/44* (2006.01)

(52) U.S. Cl.
CPC ........... *H01M 2004/028* (2013.01); *H01M 2300/0057* (2013.01)

(56) References Cited

U.S. PATENT DOCUMENTS

| | | | | |
|---|---|---|---|---|
| 5,532,078 A | * | 7/1996 | Redey | H01M 4/02 429/104 |
| 2015/0037645 A1 | * | 2/2015 | Ramani | H01M 4/048 429/231.9 |
| 2015/0162586 A1 | * | 6/2015 | Fleischmann | H01M 50/457 427/358 |
| 2016/0049641 A1 | * | 2/2016 | Li | H01M 4/62 252/182.1 |
| 2016/0141607 A1 | * | 5/2016 | Park | H01M 4/505 252/182.1 |

OTHER PUBLICATIONS

Zhan et al. "A High-Performance Na—Al Battery Based on Reversible NaAlCl4 Catholyte", Sep. 2020, Advanced Energy Materials, 10, 2001378, pp. 1-10 (Year: 2020).*
Li et al., The Role of FeS in Initial Activation and Performance Degradation of Na-NiCl2 Batteries, Aug. 2014, Elsevier, Journal of Power Sources, 272, pp. 398-403. (Year: 2014).*
Knutz et al., "Mechanism of Reaction in NaAlCl₄ Molten Salt Batteries with Nickel Felt Cathode and Aluminum Anodes," *J. Electrochem. Soc.*, Dec. 1993, 140(12):3380-3390.

* cited by examiner

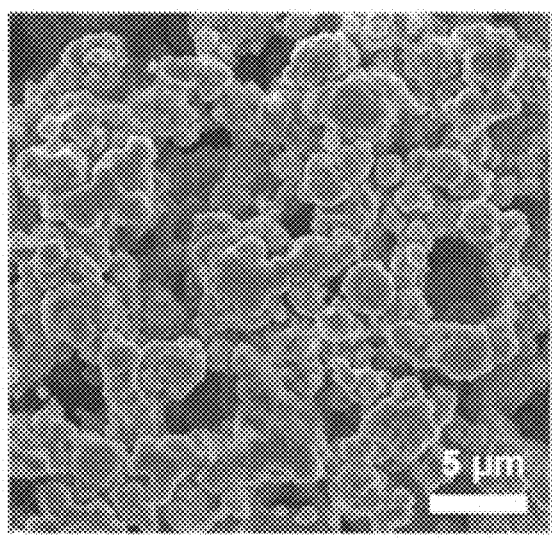
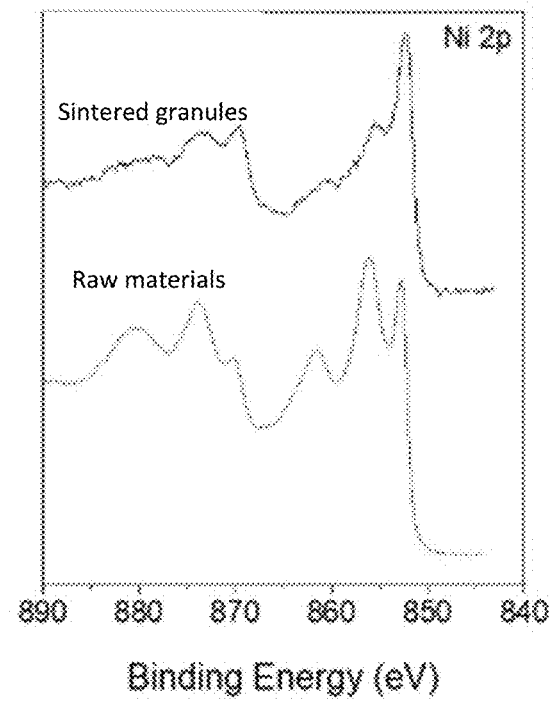
FIG. 12A  FIG. 12B
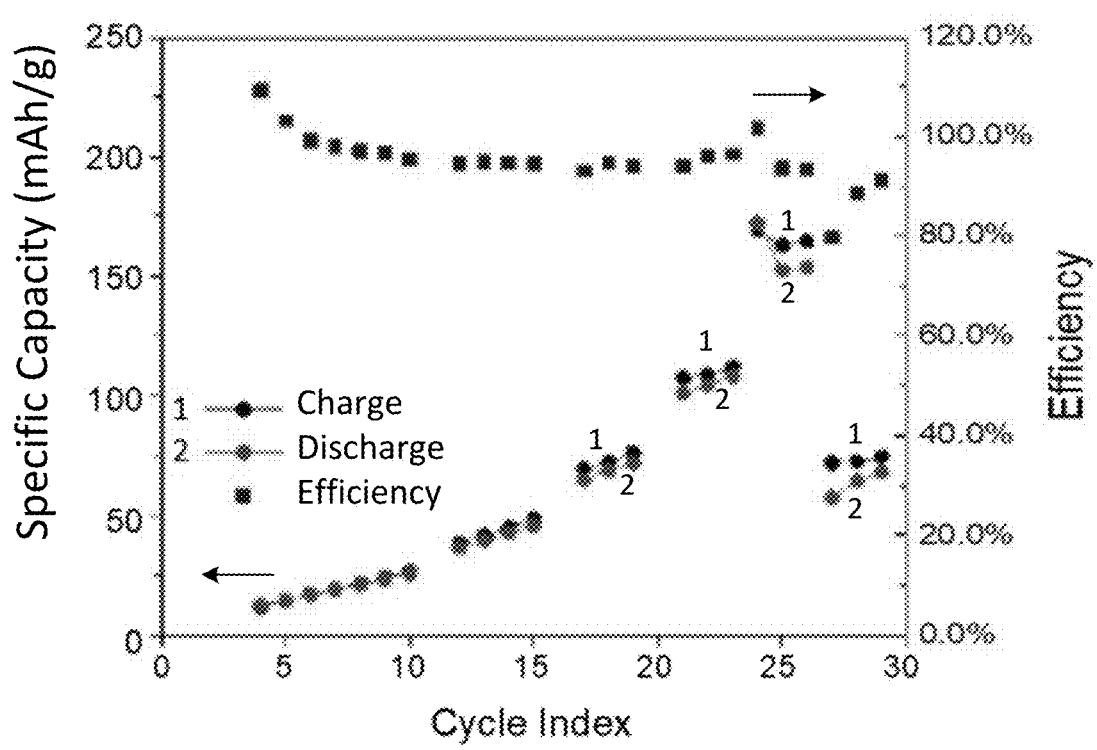
FIG. 13A

… (1/2)

SEASONAL ENERGY STORAGE TECHNOLOGIES BASED ON RECHARGEABLE BATTERIES

ACKNOWLEDGMENT OF GOVERNMENT SUPPORT

This invention was made with government support under Contract DE-AC05-76RL01830 awarded by the U.S. Department of Energy. The government has certain rights in the invention.

FIELD

This invention is directed to rechargeable batteries, as well as methods of making and using the batteries. The rechargeable batteries may be temperature activated.

SUMMARY

Embodiments of a rechargeable battery are disclosed, along with methods of using and making the battery. The rechargeable battery may be temperature activated, and is useful for energy storage.

In one implementation, a rechargeable battery comprises a cathode comprising $Ni_yFe_{1-y}$ where $0 \leq y \leq 1$; an anode comprising a current collector; a porous separator positioned between the cathode and the anode; and an electrolyte comprising $MAlX_4$, wherein M is Na, Li, K, or a combination thereof, and X is Cl, Br, I, or a combination thereof, the porous separator impregnated with the electrolyte, wherein the electrolyte is a solid at temperatures less than 50° C. The battery may further comprise sulfur. In certain embodiments, (i) the cathode further comprises $Ni_yFe_{1-y}$; or (ii) the anode further comprises Al and MX; or (iii) the rechargeable battery further comprises greater than 0 mol % and up to 10 mol % sulfur relative to moles of $Ni_yFe_{1-y}$ in the cathode; or (iv) any combination of (i), (ii), and (iii). In some examples, (i) the electrolyte comprises $NaAlCl_4$; or (ii) the cathode comprises $NiCl_2$; or (iii) both (i) and (ii).

In another implementation, a rechargeable battery comprises a cathode comprising $Ni_yFe_{1-y}X_2$ and $Ni_yFe_{1-y}$ where $0 \leq y \leq 1$; an anode comprising Al, MX, and a current collector, wherein M is Na, Li, K, or a combination thereof, and X is Cl, Br, I, or a combination thereof; a porous separator; and an electrolyte comprising $MAlX_4$, the porous separator impregnated with the electrolyte, wherein the electrolyte is a solid at temperatures less than 50° C. In certain embodiments, the anode comprises 50 mol % to 130 mol % MX relative to moles of $Ni_yFe_{1-y}$ in the cathode. In some implementations, the rechargeable battery further comprises sulfur, such as from greater than 0 mol % and up to 10 mol % sulfur relative to moles of $Ni_yFe_{1-y}X_2$ and $Ni_yFe_{1-y}$ in the cathode. In some examples, (i) the electrolyte comprises $NaAlCl_4$; or (ii) the cathode comprises $NiCl_2$ and Ni; or (iii) the anode comprises Al and NaCl; or (iv) any combination of (i), (ii), and (iii).

A method of storing energy in a rechargeable battery may include providing a rechargeable battery comprising a cathode comprising $Ni_yFe_{1-y}$ where $0 \leq y \leq 1$, an anode comprising a current collector, a porous separator positioned between the cathode and the anode, and an electrolyte comprising $MAlX_4$, wherein M is Na, Li, K, or a combination thereof, and X is Cl, Br, I, or a combination thereof, the porous separator impregnated with the electrolyte, wherein the electrolyte is a solid at temperatures less than 50° C.; heating the electrolyte to a temperature $T_1$, wherein the temperature $T_1$ is above a melting point of the electrolyte, thereby melting the electrolyte; charging the temperature-activated rechargeable battery while maintaining the temperature of the electrolyte at or greater than the temperature $T_1$; and allowing the electrolyte to cool to a temperature $T_2$, wherein the temperature $T_2$ is below the melting point of the electrolyte, thereby solidifying the electrolyte and storing energy in the temperature-activated rechargeable battery. In some embodiments, stored energy is released from the rechargeable battery by heating the electrolyte to a temperature $T_3$, wherein the temperature $T_3$ is above a melting point of the electrolyte, thereby melting the electrolyte, and discharging the rechargeable battery while maintaining the temperature of the electrolyte at or greater than the temperature $T_3$, thereby releasing some or all of the stored energy from the temperature-activated rechargeable battery. In certain embodiments, the rechargeable battery, when maintained at or below the temperature $T_2$, has: (i) a capacity retention of at least 99% of an initial charged capacity after two weeks; or (ii) a capacity retention of at least 95% of an initial charged capacity after four weeks; or (iii) both (i) and (ii).

A method of making a rechargeable battery as disclosed herein may include sintering cathode material particles to remove surface oxidation and produce porous granules, the granules comprising $Ni_yFe_{1-y}$ where $0 \leq y \leq 1$; combining the granules with molten $MAlX_4$, wherein M is Na, Li, K, or a combination thereof, and X is Cl, Br, I, or a combination thereof to provide a $Ni_yFe_{1-y}/MAlX_4$ mixture; placing a porous separator on an upper surface of the $Ni_yFe_{1-y}/MAlX_4$ mixture; placing additional $MAlX_4$ combined with 0 mol % to 10 mol % sulfur, relative to moles of the $Ni_yFe_{1-y}$, on the porous separator; melting the additional $MAlX_4$, thereby impregnating the porous separator with the additional $MAlX_4$; placing a current collector on an upper surface of the porous separator while the $MAlX_4$ is molten; and cooling the $MAlX_4$ to solidify the $MAlX_4$. In some embodiments, the method further includes activating the cathode material by heating the electrolyte to a temperature above a melting point of the electrolyte, thereby melting the electrolyte; cycling the rechargeable battery while maintaining the temperature of the electrolyte above the melting point of the electrolyte for 2-40 cycles; and allowing the electrolyte to cool to a temperature below the melting point of the electrolyte, thereby solidifying the electrolyte.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3C, scale bar 5 μm), and the corresponding energy dispersive X-ray spectrum (EDX) of the oxidized surface showing dense $NiCl_2$ flakes with scattered NaCl crystals (FIG. 3D).

FIG. 8C is s magnified view of the highlighted region of FIG. 8B.

FIG. 10A shows the cycling capacities normalized to nickel mass and efficiencies; FIG. 10B shows the representative voltage profiles at each rate/current. FIG. 10C is a comparison of the voltage profiles at 3 mA for the charged-state granule cell and the foil cell of FIG. 6.

FIG. 11B shows the representative voltage profiles at each rate/current.

FIGS. 12A and 12B are a scanning electron micrograph of discharged-state cathode granules showing micron-sized nickel metal particles (FIG. 12A), and X-ray photoelectron spectra of Ni granules before and after thermal treatment in 4% $H_2$ in $N_2$ (FIG. 12B).

FIGS. 13A-13C show cycling capacities normalized to nickel mass and corresponding efficiencies for an Al—Ni cell assembled with discharged-state cathode granules (FIG. 13A), the representative voltage profiles at each rate/current (FIG. 13B), and cycling capacities (at 3 mA) normalized to the nickel mass of the cell for the first 35 cycles, showing activation of the electrode surface until stabilization (FIG. 13C).

FIG. 14A shows voltage profiles at 3 mA for cells doped with the indicated amount of sulfur (mole percent relative to nickel present in the cathode) in the electrolyte melt; FIG. 14B shows activation of the electrode surface until stabilization with 1 mol % sulfur; FIG. 14C shows the average initial cycling capacities (at 3 mA) and corresponding efficiencies at each sulfur concentration; FIGS. 14D and 14E show cycling capacities and corresponding efficiencies for Al—Ni cells assembled with discharged-state cathode granules and an electrolyte doped with 2 mol % (FIG. 14D) and 10 mol % (FIG. 14E) sulfur to nickel present in the cathode.

DETAILED DESCRIPTION

Figure 1:
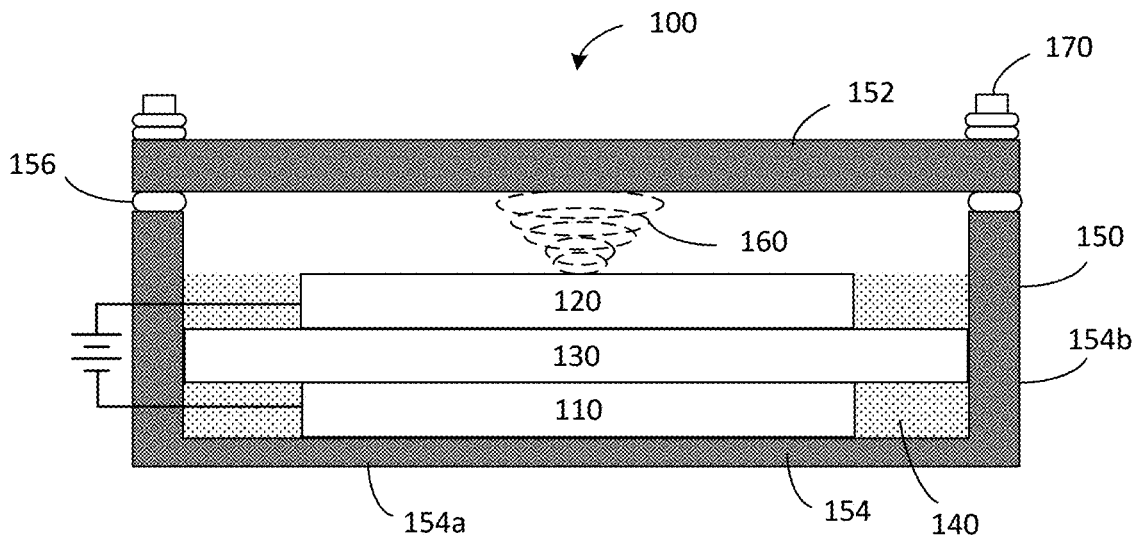
FIG. 1 is a simplified schematic diagram of one embodiment of a temperature-activated rechargeable battery.

Energy supply and demand may not be synchronized, with periods of high supply/low demand and periods of low supply/high demand throughout the seasons. For example, solar energy can be produced in excess during the long days of summer, with less energy produced during the shorter days of winter. Desirably, excess energy can be stored when demand is low and released when supplies are low and demand is high. Energy may be stored for weeks or months and released when needed.

Rechargeable batteries for long-term seasonal storage of energy are of interest as alternatives to pumped storage hydropower associated with dams, liquid air energy storage (pressure/generator), energy vault gravity storage (gravity/generator), and/or thermal storage (temperature/steam/generator). Batteries used for seasonal storage may only be cycled once or twice a year. Thus, lifespan, efficiency, safety, and capacity retention are significant factors for commercialization. Existing battery technologies suffer from high material costs, diffusion or recombination of active materials in the electrolytes during storage, parasitic reactions with electrolytes, and/or unacceptable self-discharge rates. For example, lithium ion batteries have self-discharge rates of 2-5% per month, lead acid batteries have self-discharge rates of 4-6% per month, nickel metal hydride (NiMH) batteries have self-discharge rates of ~30% per month, and nickel-cadmium batteries have self-discharge rates of 15-20% per month.

This disclosure concerns embodiments of rechargeable batteries for energy storage that solve the foregoing problems. The batteries utilize low-cost, nonhazardous materials and exhibit little or no self-discharge. The batteries are temperature activated and may be used for energy storage, such as. The disclosed rechargeable batteries include an electrolyte that is a solid at temperatures below 50° C. The battery is heated to melt the electrolyte prior to charging and then cooled below a melting point of the electrolyte to store energy once charged. The battery is heated again to discharge the stored energy. Advantageously, some embodiments of the disclosed rechargeable batteries exhibit little or no self-discharge and are suitable for seasonal energy storage.

1. DEFINITIONS AND ABBREVIATIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, molarities, voltages, capacities, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 2016 (ISBN 978-1-118-13515-0).

In order to facilitate review of the various embodiments of the disclosure, the following explanations of specific terms are provided:

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. If the anode is composed of a metal, electrons that it gives up to the external circuit are accompanied by metal cations moving away from the electrode and into the electrolyte. When the battery is recharged, the anode becomes the positive terminal where electrons flow in and metal cations are reduced. Unless otherwise specified, the term "anode" as used herein, refers to the negative electrode or terminal where electrons flow out during discharge.

Average diameter: The mathematical average diameter of a plurality of particles.

Battery/Cell: As used herein, a cell refers to an electrochemical device used for generating a voltage or current from a chemical reaction, or the reverse in which a chemical reaction is induced by a current. A battery includes one or more cells. The terms "cell" and "battery" are used interchangeably when referring to a battery containing only one cell.

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours. The term specific capacity refers to capacity per unit of mass. In this application, the mass specifically refers to the mass of the active material in the electrodes. Specific capacity may be expressed in units of mAh/g. The term specific areal capacity refers to capacity per unit of area of the electrode or active material. Specific areal capacity may be expressed in units of $mAh/cm^2$.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by positive ions moving from the electrolyte to the positive cathode, where they may be reduced. When the battery is recharged, the cathode becomes the negative terminal where electrons flow out and metal atoms (or cations) are oxidized. Unless otherwise specified, the term "cathode" as used herein, refers to the positive electrode during discharge.

Current collector: A battery component that conducts the flow of electrons between an electrode and a battery terminal. The current collector also may provide mechanical support for the electrode's active material.

Electrolyte: A substance containing free ions that behaves as an ionically conductive medium. In some embodiments, the disclosed electrolytes are molten salt electrolytes that are solid salts at low temperatures (e.g., room temperature), but function as electrolytes when heated above the melting point of the salt.

Granules: As used herein, the term granules refers to particles having an average diameter larger than 500 μm.

Grounds: Particles obtained after comminuting from larger solids, having an average diameter larger than 100 μm.

Porous: A term used to describe a material that is permeable to fluids (such as liquids or gases).

Powder: As used herein, the term powder refers to particles having an average diameter less than 250 μm.

Separator: A battery separator is a porous sheet or film placed between the anode and cathode. It prevents physical contact between the anode and cathode while facilitating ionic transport.

Sintering: Agglomeration of metal powder at a temperature below the melting point of the powder. The powdered material is heated until its particles adhere to each other. When sintering is performed under a reducing atmosphere, the process also may remove surface oxidation from the particles.

II. TEMPERATURE-ACTIVATED RECHARGEABLE BATTERIES

Temperature-activated rechargeable batteries are disclosed. The batteries include a molten salt electrolyte that is a solid at temperatures less than 50° C. When the electrolyte is in a solid form, energy is stably stored in the battery. The electrolyte is heated above its melting point to charge or discharge the battery.

FIG. 1 is a simplified schematic diagram of one embodiment of a temperature-activated rechargeable battery 100. The rechargeable battery 100 includes a cathode 110, an anode comprising a current collector 120, a porous separator 130 positioned between the cathode and the anode, and an electrolyte 140. In some embodiments, the cathode, anode, separator, and electrolyte are contained within a container 150. The container may include an upper portion 152, a lower portion 154, and a compressible gasket 156 between the upper portion 152 and the lower portion 154. In certain implementations, a compressible spring 160 is positioned between a lower surface of the upper portion 152 and the anode 120. Fasteners 170 may be used to fasten the upper portion 152 and gasket 156 to the lower portion 154. Suitable fasteners include, but are not limited to, screws, such as compression screws.

The electrolyte 140 comprises $MAlX_4$, wherein M is Na, Li, K, or a combination thereof, and X is Cl, Br, I, or a combination thereof. The electrolyte is a solid at temperatures less than 50° C. While $MAlX_4$, in some instances, may viewed as a combination of $AlX_3$ and MX, the electrolyte advantageously includes a 1:1 ratio of $AlX_3$ and MX, without an excess of any element. Thus, a molar ratio of M:Al:X in the electrolyte is 1:1:4. In some embodiments, the electrolyte comprises $Na_{a1}Li_{a2}K_{a3}AlCl_{b1}Br_{b2}I_{b3}$, where a1+a2+a3=1, where 0≤a1≤1, 0≤a2≤1, and 0≤a3≤1; and b1+b2+b3=4, and 0≤b3≤4. Thus, the electrolyte may be $NaAlCl_4$, $NaAlBr_4$, $NaAlI_4$, $LiAlCl_4$, $LiAlBr_4$, $LiAlI_4$, $KAlCl_4$, $KAlBr_4$, $KAlI_4$, or any combination thereof. In certain implementations, (i) a1=1, a2 and a3=0, (ii) b1=4, b2 and b3=0, or (iii) both (i) and (ii). When a1=1 and b1=4, the electrolyte comprises $NaAlCl_4$, and has a melting point of ~157° C. In some embodiments, the electrolyte consists essentially of, or consists of, $MAlX_4$. In certain embodiments, the electrolyte consists essentially of, or consists of, $NaAlCl_4$. By "consists essentially of" is meant that the electrolyte does not include other components that materially affect the properties of the electrolyte alone or in a system including the electrolyte. Electrolyte properties include, but are not limited to, Coulombic efficiency, cycling stability, voltage window, conductivity, and specific capacity. For example, the electrolyte does not include any electrochemically active component (i.e., a component (an element, an ion, or a compound) that is capable of forming redox pairs having different oxidation and reduction states, e.g., ionic species with differing oxidation states or a metal cation and its corresponding neutral metal atom) other than the aluminum-based salt in an amount sufficient to affect performance of the electrolyte, and does not include additives in a significant amount (e.g., >1 wt %).

In an uncharged or partially charged state, the cathode 110 comprises $Ni_yFe_{1-y}$ where 0≤y≤1. In one embodiment, y is 1, and the cathode comprises Ni. In an independent embodiment, y is 0, and the cathode comprises Fe. In another independent embodiment, 0<y<1, and the cathode comprises a combination of Ni and Fe. The cathode may comprise Ni particles and Fe particles, or the cathode may comprise a Ni/Fe alloy. In a fully uncharged state, the cathode may consist essentially of, or consist of, $Ni_yFe_{1-y}$. By "consists essentially of" is meant that the cathode does not comprise any other active material in an amount sufficient to materially affect the properties of the cathode (e.g., the specific capacity).

The overall cell reaction is shown below where M, X, and y are as previously defined:

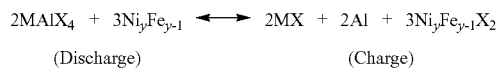

(Discharge)    (Charge)

Thus, in a partially charged state or charged state, the cathode further comprises $Ni_yFe_{1-y}X_2$. In the partially charged state or charged state, the cathode comprises a combination of $Ni_yFe_{1-y}$ and $Ni_yFe_{1-y}X_2$, which may be represented as $Ni_yFe_{1-y}/Ni_yFe_{1-y}X_2$. For example, when the cathode comprises Ni and the electrolyte comprises $NaAlCl_4$, the partially charged cathode comprises a combination of Ni and $NiCl_2$. The amount of $Ni_yFe_{y-1}$ in the uncharged cathode is in excess relative to the amount that will react to form $Ni_yFe_{y-1}X_2$ when the battery is charged. Sufficient $Ni_yFe_{y-1}$ remains in the charged cathode to provide electrical conductivity. In some embodiments, the cathode comprises 60 wt % to 80 wt % $Ni_yFe_{y-1}$ and 20 wt % to 40 wt % $Ni_yFe_{y-1}X_2$ in the fully charged state, such as 65 wt % to 75 wt % $Ni_yFe_{y-1}$ and 25 wt % to 35 wt % $Ni_yFe_{y-1}X_2$.

In any of the foregoing or following embodiments, a Ni cathode may comprise porous nickel granules. In some embodiments, the porous nickel granules have an average size of 0.5 mm to 2 mm, such as 0.5 mm to 1.5 mm, 0.7 mm to 1.3 mm, or 0.8 mm to 1.2 mm. The porous granules may be formed by sintering powder particles as described in more detail in Section IV.

The anode 120 comprises a current collector. In some embodiments, the current collector is a metal mesh, metal wire gauze or cloth, metal wool, or carbon (e.g., graphite felt). Suitable metals include, but are not limited to, aluminum, stainless steel, and molybdenum. In certain implementations, the current collector is aluminum, such as aluminum mesh or cloth. When assembled in an uncharged state and prior to any initial cycling of the battery, the anode may consist of the current collector. During a charging process, aluminum is deposited onto the current collector. Thus, in a partially or fully charged state, the anode comprises the current collector and aluminum. In certain implementations, MX (e.g., NaCl) also deposits on the current collector as the battery is charged. During a discharging process, aluminum is consumed from the anode. Deposited MX also is consumed during the discharging process. In a discharged state, the anode may retain little or no deposited aluminum and/or MX on the current collector. When assembled in a charged or partially charged state, the anode 120 comprises Al, MX, and the current collector. In some embodiments, the anode comprises 50 mol % to 130 mol % MX relative to moles of $Ni_yFe_{1-y}$ in the cathode. MX is provided in the anode to regenerate $MAlX_4$ as the battery is discharged (see overall cell reaction above). The amount of MX in the charged anode may correspond to about 10 mol % to 15 mol % of the moles of $MAlX_4$ in the electrolyte.

In any of the foregoing or following embodiments, the rechargeable battery may further comprise sulfur. Advantageously, sulfur may facilitate removal of any cathode surface passivation layer (e.g., metal oxides), thereby shortening the activation period of the rechargeable battery, (i.e., the number of initial cycles required to stabilize the battery performance and reach full capacity upon charging. In some embodiments, the rechargeable battery comprises from greater than 0 mol % and up to 10 mol % sulfur relative to moles of $Ni_yFe_{1-y}$ in the cathode. In certain embodiments, the battery comprises from 0.5 mol % S to 10 mol % S, such as from 0.5 mol % S to 5 mol % S, or 1 mol % S to 3 mol % S relative to the moles of $Ni_yFe_{1-y}$ in the cathode. In the absence of sulfur, the battery may require an induction period of from 15-30 cycles to achieve full capacity and stable performance. However, addition of sulfur may shorten the induction period to as little 2-5 cycles. Without wishing to be bound by a particular theory of operation, sulfur may react with metal oxides (e.g., on the cathode particle surface) to provide elemental metal and metal sulfate or other $SO_x$ species; the oxidized sulfur species do not participate in electrochemical reactions after the cell conditioning process. Thus, after the initial cycling to precondition, or stabilize, the battery performance, all or most of the sulfur remains as $SO_x$ species rather than elemental sulfur.

The rechargeable battery comprises a porous separator 130 between the anode 120 and the cathode 110. The porous separator may comprise any porous material that is compatible with the electrolyte and does not react during the charging and discharging processes. In some embodiments, the separator comprises glass fibers, such as a glass microfiber filter. The porous separator is impregnated with the electrolyte. Advantageously, pressure or vacuum may be applied as the porous separator is impregnated to remove trapped gas (e.g., air) from within the pores of the separator, allowing the pores to fill with molten electrolyte.

In any of the foregoing or following embodiments, the cathode, anode, separator, and electrolyte may be contained within a container 150. In some embodiments, the container 150 comprises an upper portion 152 and a lower portion 154. The lower portion may be a unitary piece comprising a bottom wall 154a and side walls 154b. A person of ordinary skill in the art will understand that, although FIG. 1 depicts an arrangement wherein the cathode 110 is positioned on the bottom wall 154a with the anode 120 positioned above the separator 130, in an alternative arrangement is equally possible wherein the anode 120 is positioned on the bottom wall 154a, with the cathode 110 positioned above the separator 130. In some implementations, a compressible gasket 156 is positioned between the upper portion 152 and the lower portion 154, such as between the upper portion 152 and the side walls 154b. The container 150 may be any material that is compatible with the cathode, anode, and electrolyte materials, and that does not react with the cathode, anode, and electrolyte materials while the battery is in storage or during operation. Suitable materials for the container include, but are not limited to, nickel-coated stainless steel, nickel clad stainless steel, nickel, molybdenum, and other inert metals/alloys that do not react when the battery is cycled. In some implementations, the container comprises nickel. In some embodiments, the compressible gasket 156 comprises a fluoropolymer, such as polytetrafluoroethylene (PTFE), or a polyethylene. In any of the foregoing or following embodiments, the rechargeable battery may further comprise a compressible spring 160 between the upper portion 152 of the container and the anode 120. The compressible spring 160 aids in maintaining intimate contact and conduction between the anode/separator and separator/cathode. In some examples, the compressible spring is a stainless steel, nickel, molybdenum, nickel-coated stainless steel, or molybdenum-coated stainless steel spring, which may be secured (such as by welding) to a lower surface of the upper portion 152. One or more fasteners 170 may be used to secure the top portion 152 and compressible gasket 156 to the lower portion 154 of the container. In some embodiments, the fasteners are screws, such as compression screws.

In some embodiments, the battery comprises a cathode comprising Ni when discharged and $NiCl_2$ when charged, an anode comprising aluminum when charged, and an electrolyte comprising $NaAlCl_4$. In such embodiments, the battery has a theoretical capacity of 287 mAh/g and may have a cell voltage of 0.9-1 V. The electrolyte has a melting point of 157° C.

III. METHODS OF USING A TEMPERATURE-ACTIVATED RECHARGEABLE BATTERY

Embodiments of the disclosed temperature-activated rechargeable batteries are suitable for energy storage. In some embodiments, the batteries are useful for large-scale seasonal energy storage for the electric grid, where excess energy is stored when available and used later. In certain implementations, the disclosed batteries provide inexpensive and robust energy storage solutions to support grid-level integration of renewable energy. Inclusion of a molten salt electrolyte that is a solid at temperatures below 50° C. allows charging and discharging operations only at elevated temperatures where the electrolyte is a liquid and literally freezes the stored chemical energy in the battery when the temperature is lower than the electrolyte melting point, thereby minimizing or eliminating self-discharge over time. To charge the battery, a current is passed to create active species at the electrodes until the redox reactions create reaches a cut-off voltage. Once fully charged, the battery is cooled to the ambient temperature, where the electrolytes solidify with the battery on idle. The batteries can idle without much loss because a lack of mobility that removes self-discharge pathways at the ambient temperature. To discharge the battery, the system is first warmed above the melting point of the electrolytes where the battery regains ion transport. With sufficient ion mobility at this point, the redox reactions at the electrodes can be reversed to generate a current, and the stored energy is released for use.

A method of using a rechargeable battery as disclosed herein may include storing energy in the rechargeable battery by providing a rechargeable battery comprising a cathode comprising $Ni_yFe_{1-y}$, where $0 \le y \le 1$, an anode comprising a current collector, a porous separator positioned between the cathode and the anode, and an electrolyte comprising $MAlX_4$, wherein M is Na, Li, K, or a combination thereof, and X is Cl, Br, I, or a combination thereof, the porous separator impregnated with the electrolyte, wherein the electrolyte is a solid at temperatures less than 50° C.; heating the electrolyte to a temperature $T_1$, wherein the temperature $T_1$ is above a melting point of the electrolyte, thereby melting the electrolyte; charging the temperature-activated rechargeable battery while maintaining the temperature of the electrolyte at or greater than the temperature $T_1$; and allowing the electrolyte to cool to a temperature $T_2$, wherein the temperature $T_2$ is below the melting point of the electrolyte, thereby solidifying the electrolyte and storing energy in the temperature-activated rechargeable battery. In some embodiments, charging the rechargeable battery comprises supplying a current to the rechargeable battery, wherein the current is sufficient to create an oxidation-reduction reaction in the electrolyte, and maintaining the current until the oxidation-reduction reaction reaches a desired cut-off voltage. The current may be from 1 mA to 5 mA, such as from 1 mA to 4 mA, or 1 mA to 3 mA. The cut-off voltage may be determined, in part, by the cathode and electrolyte compositions. In some embodiments, the upper cut-off voltage is 1.0 V to 1.2 V, and the lower cut-off voltage is at 0.5 V to 0.9 V. In certain embodiments, the upper cut-off voltage is at 1.1 V, and the lower cut-off voltage is at 0.7 V.

The temperature $T_1$ is a temperature above the melting point of the electrolyte. The temperature $T_1$ is below a temperature at which any of the other components (anode, cathode, separator, container, etc.) will melt or degrade. In some embodiments, the temperature $T_1$ is at least 5° C. higher than the electrolyte melting point, such as at least 10° C. higher, or at least 15° C. higher than the electrolyte melting point. In certain implementations, the temperature $T_1$ is from 5° C. to 50° C. higher than the electrolyte melting point, such as from 5° C. to 40° C. higher, 10° C. to 30° C. higher, or 10° C. to 20° C. higher than the electrolyte melting point. In some examples, the electrolyte comprises $NiAlCl_4$ (melting point 157° C.), and the temperature $T_1$ is from 163° C. to 207° C., such as from 163° C. to 200° C., 165° C. to 190° C., 165° C. to 180° C., or 170° C. to 180° C.

The temperature $T_2$ is a temperature below the melting point of the electrolyte. In some embodiments, the temperature $T_2$ is at least 5° C., at least 10° C., at least 25° C., at least 50° C., at least 75° C., or even at least 100° C. less than the electrolyte melting point. In certain embodiments, the temperature $T_2$ is ambient temperature, e.g., from −40° C. to 55° C. (depending on season and geographical location). In some examples, the electrolyte comprises $NiAlCl_4$, and the temperature $T_2$ is less than 152° C., less than 145° C., less than 130° C., less than 10° C., less than 80° C., or less than 60° C. In certain implementations, the temperature $T_2$ is from ambient temperature to 152° C., such as from −40° C. to 152° C., −30° C. to 100° C., or −25° C. to 55° C.

In any of the foregoing or following embodiments, the method may further include releasing stored energy from the rechargeable battery by heating the electrolyte to a temperature $T_3$, wherein the temperature $T_3$ is above a melting point of the electrolyte, thereby melting the electrolyte, and discharging the rechargeable battery while maintaining the temperature of the electrolyte at or greater than the temperature $T_3$, thereby releasing some or all of the stored energy from the temperature-activated rechargeable battery.

The temperature $T_3$ is a temperature above the melting point of the electrolyte. The temperature $T_3$ is below a temperature at which any of the other components (anode, cathode, separator, container, etc.) will melt or degrade. In some embodiments, the temperature $T_3$ is at least 5° C. higher than the electrolyte melting point, such as at least 10° C. higher, or at least 15° C. higher than the electrolyte melting point. In certain implementations, the temperature $T_3$ is from 5° C. to 50° C. higher than the electrolyte melting point, such as from 5° C. to 40° C. higher, 10° C. to 30° C. higher, or 10° C. to 20° C. higher than the electrolyte melting point. In some examples, the electrolyte comprises $NiAlCl_4$ (melting point 157° C.), and the temperature $T_3$ is from 163° C. to 207° C., such as from 163° C. to 200° C., 165° C. to 190° C., 165° C. to 180° C., or 170° C. to 180° C. The temperature $T_3$ may be the same as or different than the temperature $T_1$.

The battery is maintained at the temperature $T_2$ for energy storage. While the temperature $T_2$ may fluctuate during energy storage in some implementations, it remains below the electrolyte melting point, thereby maintaining the electrolyte in a solidified or frozen state during storage. The solidified electrolyte "locks" the stored energy in the rechargeable battery by reducing or eliminating mobility of active species in the battery. Maintaining the battery at the temperature $T_2$ reduces or eliminates self-discharge of the battery over time. In some embodiments, the rechargeable battery maintained at or below the temperature $T_2$ exhibits a capacity retention of at least 99% of the initial charged capacity after two weeks, such as a capacity retention of 99-100%, 99.2-100%, or 99.5-100% after two weeks. In certain embodiments, the rechargeable battery maintained at or below the temperature $T_2$ exhibits a capacity retention of at least 95% of the initial charged capacity after four weeks, such as a capacity retention of 95-100%, 95-99.5%, or 96-99% after four weeks. In one example, a Ni—Al rechargeable battery with a $NaAlCl_4$ electrolyte exhibited a capacity retention of 96.5% of the initial charged capacity over four weeks.

IV. METHODS OF MAKING A TEMPERATURE-ACTIVATED RECHARGEABLE BATTERY

A temperature-activated rechargeable battery may be made in a discharged state. The method of making may include sintering cathode material particles to remove surface oxidation and produce porous granules, the granules comprising $Ni_yFe_{1-y}$ where $0 \leq y \leq 1$; combining the granules with molten $MAlX_4$ wherein M is Na, Li, K, or a combination thereof, and X is Cl, Br, I, or a combination thereof to provide a $Ni_yFe_{1-y}/MAlX_4$ mixture; placing a porous separator on an upper surface of the $Ni_yFe_{1-y}/MAlX_4$ mixture; placing a mixture comprising additional $MAlX_4$ combined with 0 mol % to 10 mol % sulfur (relative to moles of the $Ni_yFe_{1-y}$) on the porous separator; melting the additional $MAlX_4$ under heat, thereby impregnating the porous separator with the $MAlX_4$; placing a current collector on an upper surface of the porous separator while the $MAlX_4$ is molten; and cooling the $MAlX_4$ to solidify the $MAlX_4$. In some embodiments, prior to placing the porous separator on the upper surface of the $Ni_yFe_{1-y}/MAlX_4$ mixture, the method further comprises cooling the $Ni_yFe_{1-y}/MAlX_4$ mixture to solidify the molten $MAlX_4$; and comminuting the $Ni_yFe_{1-y}/MAlX_4$ mixture to provide grounds, with an average size of 0.1 to 2 mm. In some implementations, the method further includes applying pressure to the porous separator to remove gas from pores of the porous separator while impregnating the porous separator with the additional $MAlX_4$.

In any of the foregoing or following embodiments, the cathode material particles may be Ni particles, Fe particles, Ni/Fe alloy particles, or any combination thereof. The particles may include oxides on the particle surfaces. In some embodiments, the cathode material particles are powder particles. In some implementations, the powder particles may have an average size of from 0.01 µm to 100 µm, such as 0.1 µm to 50 µm, 0.1 µm to 10 µm, 0.1 µm to 5 µm, 0.1 µm to 2 µm, or 0.2 µm to 2 µm. Sintering the particles may include heating the particles in a reducing atmosphere, such as a $H_2/N_2$ atmosphere. In some embodiments, sintering the particles removes surface oxides and/or anneals the particles to provide porous granules. The porous granules may have an average size of from 0.01 mm to 10 mm, such as from 0.1 mm to 5 mm, 0.1 mm to 3 mm, or 0.5 mm to 2 mm. In some examples, Ni powder with an average particle size of 1-2 µm was reduced and sintered to form porous granules having an average particle size of ~1 mm.

In any of the foregoing or following embodiments, the method may further comprise adding sulfur to the additional $MAlX_4$. Sulfur may be added in an amount of greater than 0 mol % and up to 10 mol % relative to moles of $Ni_yFe_{1-y}$. In some embodiments, the sulfur is added to the molten $Ni_yFe_{1-y}/MAlX_4$ mixture.

In any of the foregoing or following embodiments, the method may further include placing the $Ni_yFe_{1-y}/MAlX_4$ mixture into a lower portion of a container before placing the porous separator onto the upper surface of the $Ni_yFe_{1-y}/MAlX_4$ mixture. In such embodiments, the method may further include evacuating the headspace of the container to remove gas (e.g., air) and facilitate intimate mixing of the $Ni_yFe_{1-y}$ and $MAlX_4$. In some implementations, the method may further include applying pressure to the porous separator, or evacuating the headspace of the container, to remove trapped gas from pores of the porous separator while impregnating the porous separator with the additional $MAlX_4$. After cooling the contents to solidify the $MAlX_4$, a compressible gasket and an upper portion of the container may be placed on the lower portion of the container, and the container may be sealed. In some embodiments, sealing the container includes inserting fasteners (e.g., compression screws) through apertures in the upper portion and gasket, and into openings in side walls of the lower portion. The fasteners are then tightened to seal the container. A compressible spring may be affixed to a lower surface of the upper portion of the container. In such implementations, tightening the fasteners may also cause the spring to apply pressure to the current collector, ensuring intimate contact between the current collector, porous separator, and cathode material.

In an independent embodiment, the method of making includes sintering cathode material particles to remove surface oxidation and produce porous granules, the granules comprising $Ni_yFe_{1-y}$ where $0 \leq y \leq 1$; placing a porous separator on an upper surface of the $Ni_yFe_{1-y}$ granules; placing $MAlX_4$ combined with 0 mol % to 10 mol % sulfur (relative to moles of the $Ni_yFe_{1-y}$) on the porous separator; melting the $MAlX_4$ under heat, thereby impregnating the porous separator with the $MAlX_4$; placing a current collector on an upper surface of the porous separator while the $MAlX_4$ is molten; and cooling the $MAlX_4$ to solidify the $MAlX_4$. In some implementations, the method further includes applying pressure to the porous separator to remove gas from pores of the porous separator while impregnating the porous separator with the $MAlX_4$. Alternatively, if the components are assembled in a container, the method may further include evacuating the headspace of the container to remove gas from pores of the porous separator while impregnating the porous separator with the $MAlX_4$ and/or to ensure intimate mixing of the $Ni_yFe_{1-y}$ granules and $MAlX_4$.

In any of the foregoing or following embodiments, the method may further comprise activating the cathode material. Activating the cathode material may include removing any residual oxide from the cathode material surface. In some embodiments, activating the cathode is performed by heating the electrolyte to a temperature above a melting point of the electrolyte, thereby melting the electrolyte; cycling the rechargeable battery while maintaining the temperature of the electrolyte above the melting point of the electrolyte for 2-40 cycles; and allowing the electrolyte to cool to a temperature below the melting point of the electrolyte, thereby solidifying the electrolyte. In one embodiment, the electrolyte is maintained at a constant temperature above the melting point while cycling the rechargeable battery. In an independent embodiment, the electrolyte temperature may fluctuate while cycling the rechargeable battery, but remains above the melting point of the electrolyte throughout the cycling process. Activation is determined to be complete when the battery has achieved a stable, maximal specific capacity, such as when the specific capacity of the charged battery varies by less than ±5% over 2-3 consecutive cycles, less than ±3% over 2-3 consecutive cycles, or less than ±1% over 2-3 consecutive cycles. In some embodiments, activation includes cycling the battery for 2-30 cycles, 2-20 cycles, 2-15 cycles, 3-10 cycles, or 5-10 cycles.

V. REPRESENTATIVE EMBODIMENTS

Certain representative embodiments are exemplified in the following paragraphs.

A rechargeable battery, comprising a cathode comprising $Ni_yFe_{1-y}$ where $0 \leq y \leq 1$; an anode comprising a current collector; a porous separator positioned between the cathode and the anode; and an electrolyte comprising $MAlX_4$, wherein M is Na, Li, K, or a combination thereof, and X is Cl, Br, I, or a combination thereof, the porous separator impregnated with the electrolyte, wherein the electrolyte is a solid at temperatures less than 50° C.

The rechargeable battery of the prior paragraph, wherein the electrolyte comprises $Na_{a1}Li_{a2}K_{a3}AlCl_{b1}Br_{b2}I_{b3}$, where: $a1+a2+a3=1$, where $0 \leq a1 \leq 1$, $0 \leq a2 \leq 1$, and $0 \leq a3 \leq 1$; and $b1+b2+b3=4$, where $0 \leq b1 \leq 4$, $0 \leq b2 \leq 4$, and $0 \leq b3 \leq 4$.

The rechargeable battery of either of the foregoing paragraphs, wherein: (i) the electrolyte comprises $NaAlCl_4$; or (ii) the cathode comprises Ni; or (iii) both (i) and (ii).

The rechargeable battery of any of the foregoing paragraphs, a molar ratio of M:Al:X in the electrolyte is 1:1:4.

The rechargeable battery of any of the foregoing paragraphs, wherein the cathode comprises porous nickel granules having an average size of 0.5 mm to 2 mm.

The rechargeable battery of any of the foregoing paragraphs, wherein the rechargeable battery further comprises sulfur.

The rechargeable battery of any of the foregoing paragraphs, wherein the rechargeable battery further comprises greater than 0 mol % and up to 10 mol % sulfur relative to moles of $Ni_yFe_{1-y}$ in the cathode.

The rechargeable battery of any of the foregoing paragraphs, wherein: (i) the cathode further comprises $Ni_yFe_{1-y}X_2$; or (ii) the anode further comprises Al and MX; or (iii) both (i) and (ii).

The rechargeable battery of any of the foregoing paragraphs, further comprising a container containing the cathode, the anode, the porous separator, and the electrolyte, the container comprising: an upper portion; a lower portion; and a compressible gasket between the upper portion and the lower portion.

A rechargeable battery, comprising: a cathode comprising $Ni_yFe_{1-y}X_2$ and $Ni_yFe_{1-y}$ where $0 \leq y \leq 1$; an anode comprising Al, MX, and a current collector, wherein M is Na, Li, K, or a combination thereof, and X is Cl, Br, I, or a combination thereof; a porous separator; and an electrolyte comprising $MAlX_4$, the porous separator impregnated with the electrolyte, wherein the electrolyte is a solid at temperatures less than 50° C.

The rechargeable battery of the foregoing paragraph, wherein the electrolyte comprises $Na_{a1}Li_{a2}K_{a3}AlCl_{b1}Br_{b2}I_{b3}$, where: $a1+a2+a3=1$, where $0 \leq a1 \leq 1$, $0 \leq a2 \leq 1$, and $0 \leq a3 \leq 1$; and $b1+b2+b3=4$, where $0 \leq b1 \leq 4$, $0 \leq b2 \leq 4$, and $0 \leq b3 \leq 4$.

The rechargeable battery of either of the foregoing paragraphs, wherein: (i) the electrolyte comprises $NaAlCl_4$; or (ii) the cathode comprises $NiCl_2$ and Ni; or (iii) the anode comprises Al and NaCl; or (iv) any combination of (i), (ii), and (iii).

The rechargeable battery of any of the foregoing paragraphs, wherein a molar ratio of M:Al:X in the electrolyte is 1:1:4.

The rechargeable battery of any of the foregoing paragraphs, wherein the anode comprises 50 mol % to 130 mol % MX relative to moles of $Ni_yFe_{1-y}$ in the cathode.

The rechargeable battery of any of the foregoing paragraphs, wherein the rechargeable battery further comprises sulfur.

The rechargeable battery of any of the foregoing paragraphs, wherein the rechargeable battery comprises greater than 0 mol % and up to 10 mol % sulfur relative to moles of $Ni_yFe_{1-y}X_2$ and $Ni_yFe_{1-y}$ in the cathode.

The rechargeable battery of any of the foregoing paragraphs, further comprising a container containing the cathode, the anode, the porous separator, and the electrolyte, the container comprising: an upper portion; a lower portion; and a compressible gasket between the upper portion and the lower portion.

A method, comprising: storing energy in a rechargeable battery by providing a rechargeable battery comprising a cathode comprising $Ni_yFe_{1-y}$ where $0 \leq y \leq 1$, an anode comprising a current collector, a porous separator positioned between the cathode and the anode, and an electrolyte comprising $MAlX_4$, wherein M is Na, Li, K, or a combination thereof, and X is Cl, Br, I, or a combination thereof, the porous separator impregnated with the electrolyte, wherein the electrolyte is a solid at temperatures less than 50° C.; heating the electrolyte to a temperature $T_1$, wherein the temperature $T_1$ is above a melting point of the electrolyte, thereby melting the electrolyte; charging the temperature-activated rechargeable battery while maintaining the temperature of the electrolyte at or greater than the temperature $T_1$; and allowing the electrolyte to cool to a temperature $T_2$, wherein the temperature $T_2$ is below the melting point of the electrolyte, thereby solidifying the electrolyte and storing energy in the temperature-activated rechargeable battery.

The method of the foregoing paragraph, wherein charging the rechargeable battery comprises supplying a current to the rechargeable battery, wherein the current is sufficient to create an oxidation-reduction reaction in the electrolyte; and maintaining the current until the oxidation-reduction reaction reaches a desired cut-off voltage.

The method of the foregoing paragraph, wherein the current is from 1 mA to 5 mA.

The method of any of the foregoing paragraphs, further comprising: releasing stored energy from the rechargeable battery by heating the electrolyte to a temperature $T_3$, wherein the temperature $T_3$ is above a melting point of the electrolyte, thereby melting the electrolyte, and discharging the rechargeable battery while maintaining the temperature of the electrolyte at or greater than the temperature $T_3$, thereby releasing some or all of the stored energy from the temperature-activated rechargeable battery.

The method of any of the foregoing paragraphs, wherein: the electrolyte comprises $NiAlCl_4$; the temperature $T_1$ is greater than 160° C.; and the temperature $T_2$ is less than 150° C.

The method of any of the foregoing paragraphs, wherein the temperature $T_2$ is ambient temperature.

The method of any of the foregoing paragraphs, wherein the rechargeable battery, when maintained at or below the temperature $T_2$, has: (i) a capacity retention of at least 99% of an initial charged capacity after two weeks; or (ii) a capacity retention of at least 95% of an initial charged capacity after four weeks; or (iii) both (i) and (ii).

A method of making a rechargeable battery, the method comprising: sintering cathode material particles to remove surface oxidation and produce porous granules, the granules comprising $Ni_yFe_{1-y}$ where $0 \leq y \leq 1$; combining the granules with molten $MAlX_4$, wherein M is Na, Li, K, or a combination thereof, and X is Cl, Br, I, or a combination thereof to provide a $Ni_yFe_{1-y}/MAlX_4$ mixture; placing a porous separator on an upper surface of the $Ni_yFe_{1-y}/MAlX_4$ mixture; placing additional $MAlX_4$ combined with 0 mol % to 10 mol % sulfur, relative to moles of the $Ni_yFe_{1-y}$, on the porous separator; melting the additional $MAlX_4$, thereby impregnating the porous separator with the additional $MAlX_4$; placing a current collector on an upper surface of the porous separator while the $MAlX_4$ is molten; and cooling the $MAlX_4$ to solidify the $MAlX_4$.

The method of the foregoing paragraph, wherein the granules are combined with molten $MAlX_4$ in a container, the method further comprising: (i) evacuating gas from the container containing granules and molten $MAlX_4$; or (ii) applying pressure to the porous separator to remove gas from pores of the porous separator while impregnating the porous separator with the additional $MAlX_4$; or (iii) both (i) and (ii)

The method of either of the foregoing paragraphs, further comprising, prior to placing the porous separator on the upper surface of the $Ni_yFe_{1-y}/MAlX_4$ mixture:cooling the $Ni_yFe_{1-y}/MAlX_4$ mixture to solidify the molten $MAlX_4$; and comminuting the $Ni_yFe_{1-y}/MAlX_4$ mixture to provide grounds having an average size of 0.1 to 2 mm.

The method of any of the foregoing paragraphs, further comprising, activating the cathode material by: heating the electrolyte to a temperature above a melting point of the electrolyte, thereby melting the electrolyte; cycling the rechargeable battery while maintaining the temperature of the electrolyte above the melting point of the electrolyte for 2-40 cycles; and allowing the electrolyte to cool to a temperature below the melting point of the electrolyte, thereby solidifying the electrolyte.

VI. EXAMPLES

Materials Preparation

The catholyte, sodium aluminum tetrachloride ($NaAlCl_4$), was synthesized inside a $N_2$-filled glove box ($O_2 < 0.6$ ppm and $H_2O < 0.1$ ppm) using a previously described reaction process (Chang et al., *J Mater. Chem. A* 2018, 6(40):19703-198711; Zhang et al., *Energy Stor. Mater.* 2020, 24:177-187). NaCl (Alfa Aesar, 99.9%) and anhydrous $AlCl_3$ (Alfa Aesar, 99.985%) in a molar ratio of 1.1:1 were used as the starting materials; 10% excess NaCl was added to obtain basic (NaCl-saturated) $NaAlCl_4$. Nickel foil (0.127 mm thick, annealed, 99+% metal basis) and aluminum foil (0.5 mm thick, Puratronic 99.998% metal basis) were obtained from Alfa Aesar and used as received. Aluminum wire cloth (200 mesh, vapor degreased) was obtained from McMaster Carr and used as received. Glass microfiber filter media (Grade B) were obtained from Sterlitech and trimmed to appropriate sizes without further modifications.

Materials Characterization

Powder X-ray Diffraction (XRD): Diffraction patterns were obtained using a Rigaku MiniFlex II X-ray diffractometer (Cu K$\alpha$, 30 kV, 15 mA). Powders were loaded onto XRD sample holders in a $N_2$-filled glovebox and covered with Kapton tape to prevent degradation from exposure to air.

Scanning Electron Microscopy: Micrograms were obtained on a JEOL JSM-5900LV equipped with an Oxford EDX instrument with a lithium drift detector. To clearly observe the surface transformation on metallic nickel and aluminum, electrodes were gently washed and soaked in dimethoxyethane (DME) for approximately 30 minutes to remove residual $NaAlCl_4$ melt.

X-ray Photoelectron Spectroscopy: spectrograms were obtained on a Physical Electronics Quantum 2000 Scanning ESCA (electron spectroscopy for chemical analysis) microprobe, with a focused, monochromatic Al K$\alpha$ X-ray (1486.7 eV) source and a spherical section analyzer.

Cell Assembly

A typical planar cell comprises two nickel cell caps, one or two molybdenum current collectors (0.875 in diameter disks), a glass microfiber separator, and a PTFE insulation gasket. Metallic electrode foils/meshes were first spot weld onto the molybdenum current collectors. Stainless steel conical compression springs were weld onto the center of the top cell caps to provide stability and conduction. The entire assembly process was carried out in a $N_2$-filled glove box ($O_2$<0.6 ppm and $H_2O$<0.1 ppm).

For cells assembled in the discharged state, the cathode (Ni) was placed into the cell cap and then the separator was placed directly on top. 1.5 g of $NaAlCl_4$ melt was placed on the separator, and the cell part was heated on a hot plate at 190° C. for solid electrolyte to melt and infiltrate the porous separator. The anode (Al) was then placed on the molten electrolyte and pressed to remove any trapped air pockets. After cooling the cell cap to the room temperature, the full cell was assembled with a PTFE gasket between the two cell caps and then compression sealed by screws that were loaded with spring washers and mica insulation plates.

The cathode for the Al—Ni cell assembled in the charged state is obtained by isolating the cathode granules from a Na—$NiCl_2$ cell at the charged state, consisting of mostly a mixture of $NaAlCl_4$, Ni, and $NiCl_2$ (Chang et al., *J Mater. Chem. A* 2018, 6(40):19703-198711; Zhang et al., *Energy Stor. Mater.* 2020, 24:177-187). The cathode samples were thoroughly ground.

Electrochemical Characterization:

CV scans and electrodeposition experiments were performed at 190° C. in a glove box using NaCl-saturated $NaAlCl_4$ as the electrolyte. CV measurements were conducted on the three-electrode configuration using a CHI 660E electrochemical workstation (CH Instruments); a Mo wire (diameter 0.01 in. (0.25 mm)) with a metal foil (Mo or Ni, dependent on experiments) attached at the end was used as the working electrode, and strips of Al foil served as both counter and reference electrodes.

Al electrodeposition on Mo substrates was carried out using a two-electrode configuration with Al and Mo foils as the anode and cathode, respectively.

Galvanostatic cycling tests were performed using an Arbin potentiostat (MSTAT 8000). For cells assembled in a discharged state, the cell was cycled within a voltage window of 0.8-1.1 V for several cycles with currents at 1 mA, 2 mA, 3 mA, 4 mA, and 5 mA.

Example 1

Ni—Al Battery with $NaAlCl_4$ Electrolyte

A Ni—Al cell was assembled in a discharged state as described above with a fiberglass separator. The half reactions at each electrode during charging are:

  (anode)

  (cathode)

  (overall reaction)

The cell is designed to operate at 175° C. where the $NaAlCl_4$ electrolyte is molten (m.p. 157° C.). The above equation yields ΔG at −527.0 kJ with a corresponding cell voltage at 0.91 V. The proposed system has a simple construction with low-cost and abundant active materials, amenable for scale-up.

Figure 2A:
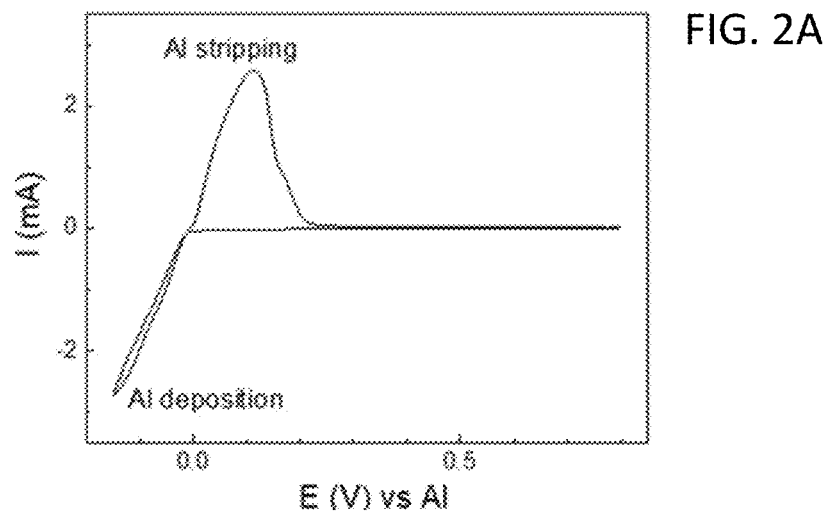
FIGS. 2A and 2B are cyclic voltammograms showing reversible stripping and deposition of aluminum at an anode (FIG. 2A) and reversible conversion between Ni and $NiCl_2$ (FIG. 2B) at a cathode of a temperature-activated rechargeable battery.
Figure 2B:
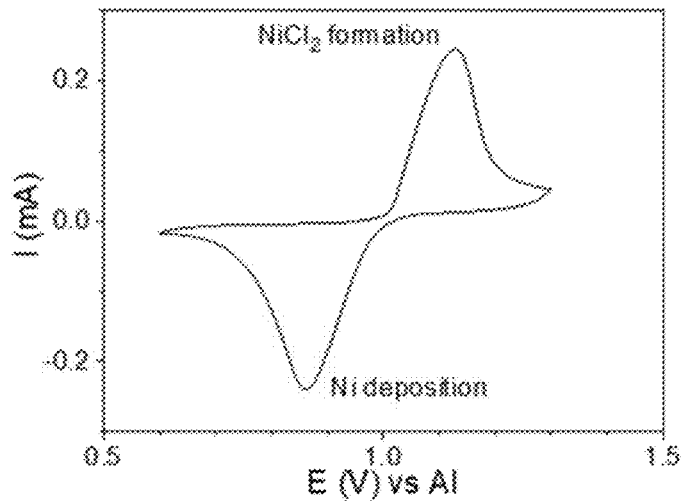
Figure 3A:
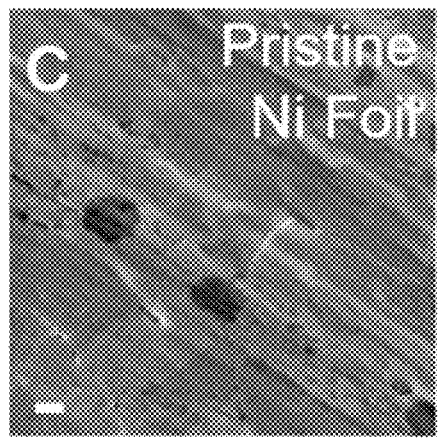
FIGS. 3A-3D are scanning electron micrographs of a nickel foil surface prior to oxidation (FIG. 3A, scale bar 1 μm) and the nickel foil surface after oxidation (FIG. 3B, scale bar 1 μm.
Figure 3B:
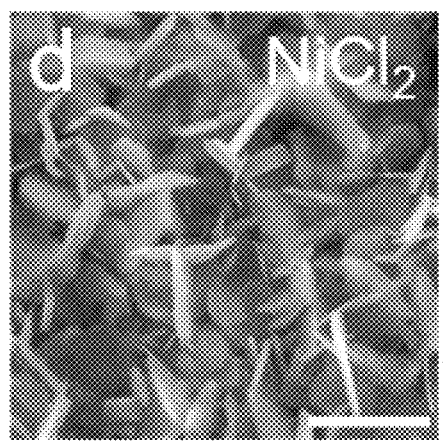
Figure 3C:
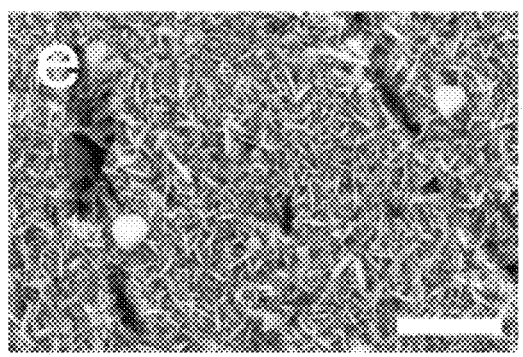
Figure 3D:
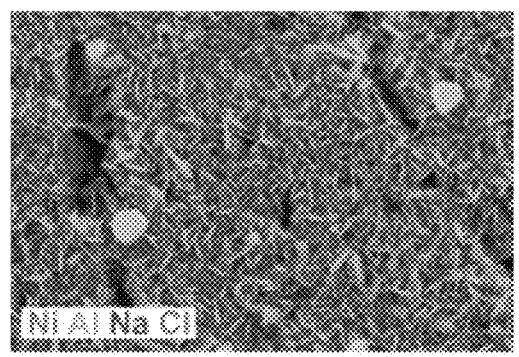
Figure 4A:
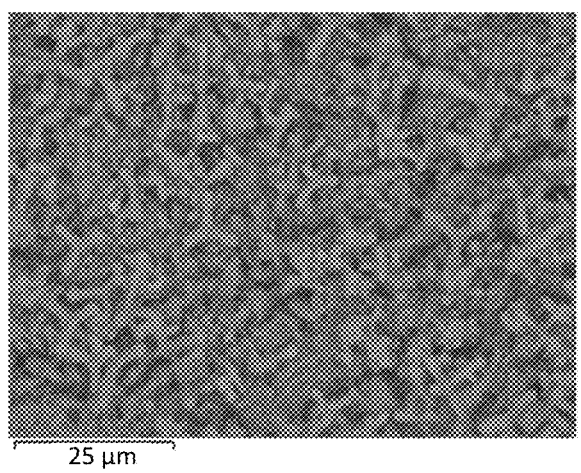
FIGS. 4A-4C are a scanning electron micrograph (FIG. 4A) and an EDX layered image (FIG. 4B) showing an aluminum anode with NaCl deposition, and a scanning electron micrograph (FIG. 4C) and an EDX layered image (FIG. 4D) showing a nickel cathode with $NiCl_2$ deposition.
Figure 4B:
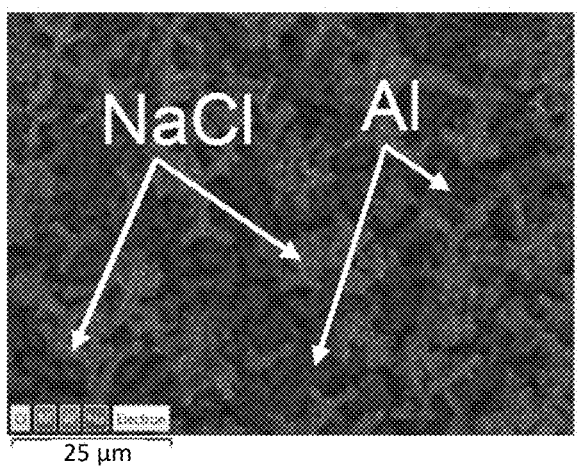
Figure 4C:
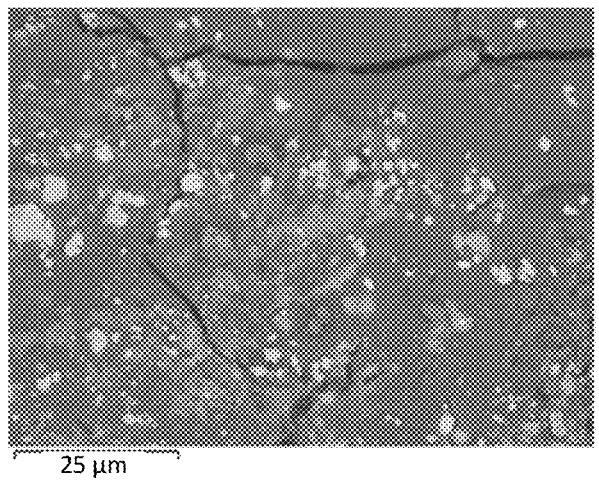
Figure 4D:
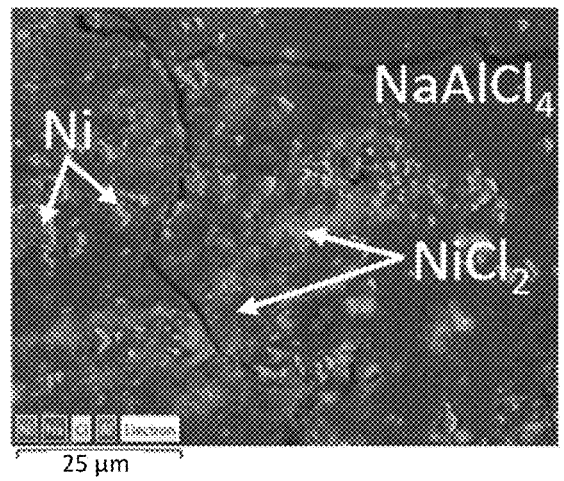
Figure 5:
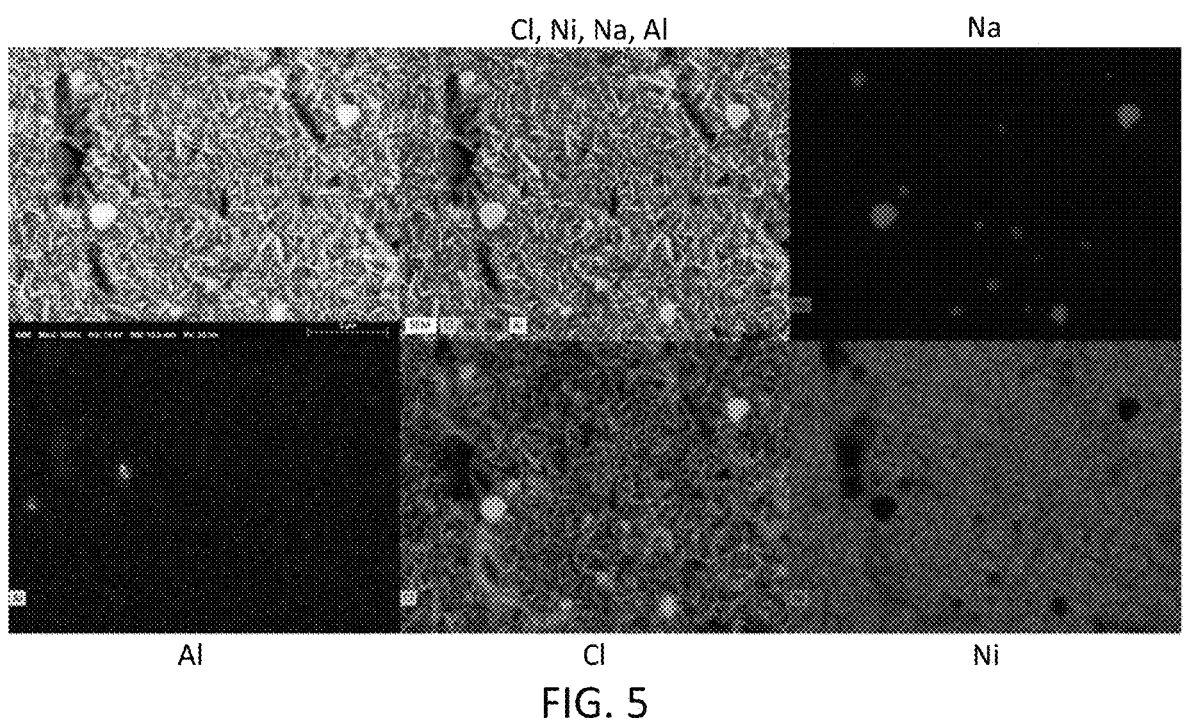
FIG. 5 is a scanning electron micrograph of deposited $NiCl_2$ on a nickel metal electrode with corresponding elemental mapping via energy dispersive X-ray spectroscopy.

On the aluminum anode, highly reversible stripping and deposition waves around 0 V with small deposition overpotentials were observed (FIG. 2A). On the cathode, a diffusion controlled redox wave centered around 1.0 V vs Al/$Al^{3+}$ indicated the reversible conversion between Ni and $NiCl_2$ (FIG. 2B). Via scanning electron microscopy (FIGS. 3A and 3B), the formation of $NiCl_2$ was evident through platelets on the order of 1 μm wide and 0.1 μm thick that densely covered the electrode surface, whereas the pristine foil was smooth prior to deposition. Sodium chloride crystals on the order of 1 μm or less were scattered amidst the $NiCl_2$ platelets (FIGS. 3C and 3D; FIG. 5). FIGS. 4A and 4B are a SEM image and EDX layered image showing the aluminum anode with NaCl deposition. FIGS. 4C and 4D are a SEM image and EDX layered image showing the nickel cathode with $NiCl_2$ deposition.

Figure 6:
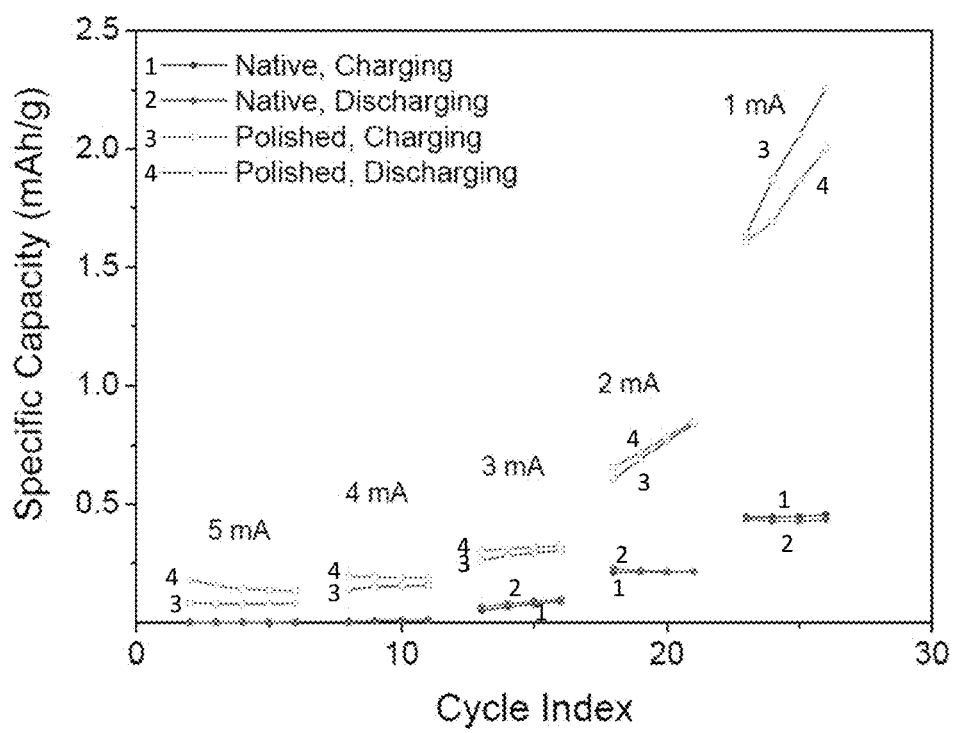
FIG. 6 shows cycling capacities at different rates/currents for Al—Ni cells assembled with metal foils; the closed circles represent native foils without any surface treatments, the open circles represent foils that were mechanically polished before cell assembly.
Figure 7:
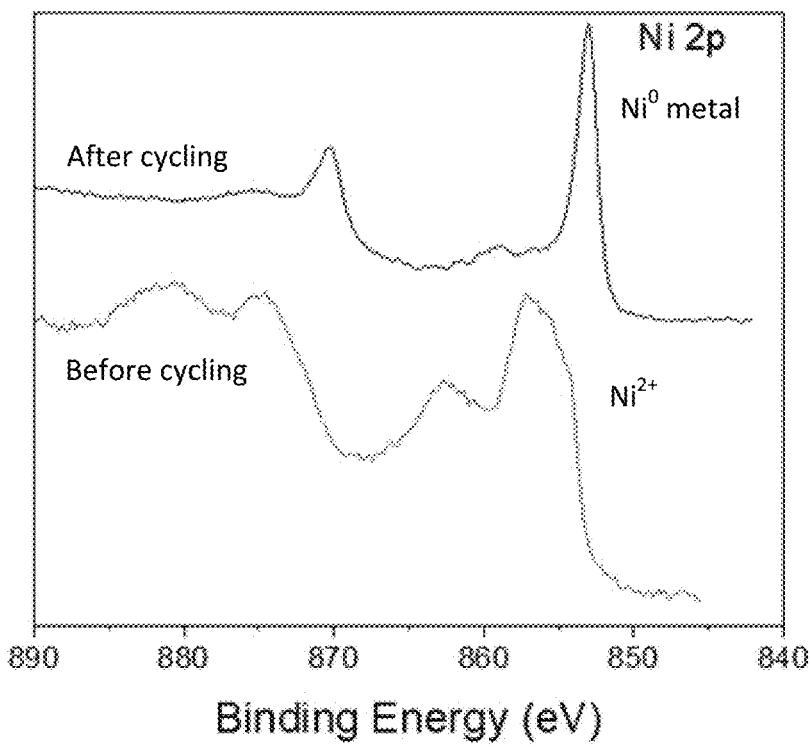
FIG. 7 shows the Ni 2p region of the X-ray photoelectron spectra on the cathode foil in a cell assembled with native, untreated foils, before and after cycling.
Figure 8A:
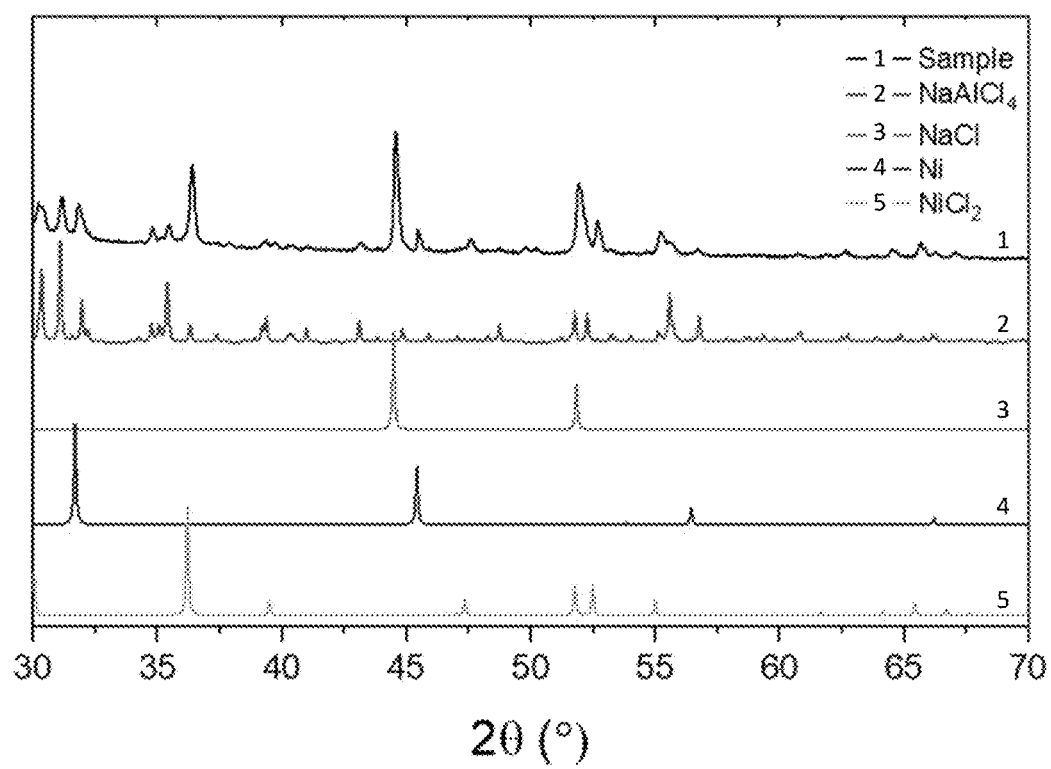
FIGS. 8A-8C are a powder X-ray diffraction pattern of cathode granules isolated from a Ni—$NiCl_2$ battery (FIG. 8A) and scanning electron micrographs and energy dispersive X-ray spectra showing $NiCl_2$ flakes surrounded by $NaAlCl_4$ (FIGS. 8B, 8C)
Figures 8B, 8C:
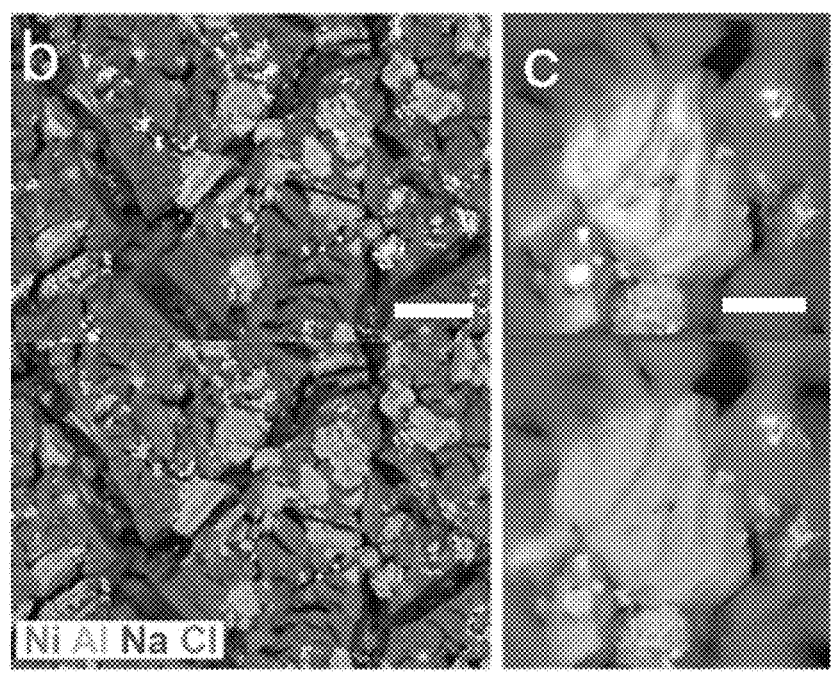
Figure 9:
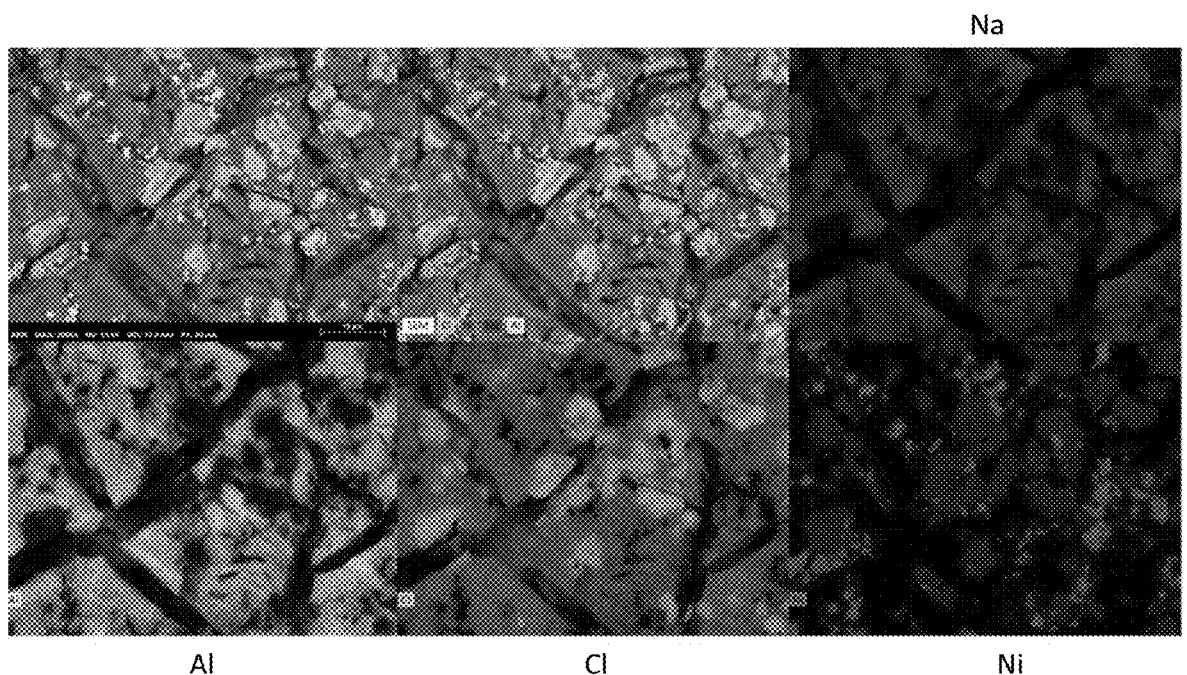
FIG. 9 is a scanning electron micrograph of an isolated charged-state cathode containing $NiCl_2$, Ni, and $NaAlCl_4$ from a Na—$NiCl_2$ cell with corresponding elemental mapping via energy dispersive X-ray spectroscopy.

Considering the overall equation, the cell at the discharged state with nickel metal and molten salt is easier to assemble. From the charged state, $NiCl_2$ is inherently passivating and must be placed in the immediate vicinity of the current collector, which process is nontrivial. With a metallic aluminum current collector at the anode to facilitate deposition, a cell was assembled directly from commercially available metal foils. The resultant Al—Ni foil cell could cycle eventually, but the capacity was abysmal (FIG. 6). The specific discharge capacity with respect to the nickel cathode mass for the cell was averaged to be 2.0 μAh/g at 5 mA, 8.5 μAh/g at 4 mA, 82 μAh/g at 3 mA, 220 μAh/g, and 430 μAh/g at 1 mA. The utilization of the metallic nickel was less than 0.05% at 1 mA. The performance was not surprising. Commercially available metal foils develop a passivating oxide layer, as can be clearly distinguished from the electrode surface before and after cycling experiments (FIG. 7). From XPS, the cathode surface (Ni) changed drastically during cycling. The pre-cycling nickel surface showed one set of broad peak between 855 and 857 eV in the Ni 2p region (862 eV satellite), which implies multiple oxidation states with a significant presence of nickel oxides on surface from higher binding energies. Simply, mechanic polishing of the electrode surface with sandpaper can activate the surface and significantly increase the specific discharge capacity to an average of 0.15 mAh/g at 5 mA, 0.19 mAh/g at 4 mA, 0.31 mAh/g at 3 mA, 0.75 mAh/g, and 1.8 mAh/g at 1 mA (FIG. 6). Even so, the increased capacity only represents about 0.2% of the nickel metal present in the cell at 1 mA. The current approach to cell assembly perhaps needs significant changes to improve cell performance, 1) increasing electrode surface area to maximize specific capacity and 2) removing passivation layers to facilitate surface reactions.

Assembling the cell in a charged state could bypass some challenging cathode activation evens and allow greater utilization of the cell capacity. While the cathode composition at the charged state is simple, $NiCl_2$ and NaCl are both insulating solid powders that are typically difficult to integrate into a separate current collector. A Na—$NiCl_2$ battery from previous work provided access to $NiCl_2$ intimately coated on a conductive metallic Ni network with finely dispersed NaCl when the cell is charged:

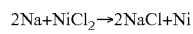

The cathode materials from that cell can be isolated and transplanted into the cathode compartment of an Al—Ni cell. Under a scanning electron microscope, the micron-sized platelets of $NiCl_2$ surrounded by $NaAlCl_4$ could clearly be seen in FIGS. 8A-8C, and 9, where the cathode of Na—$NiCl_2$ is removed under a charged state with capacity of 250 mAh/g.

Figure 10A:
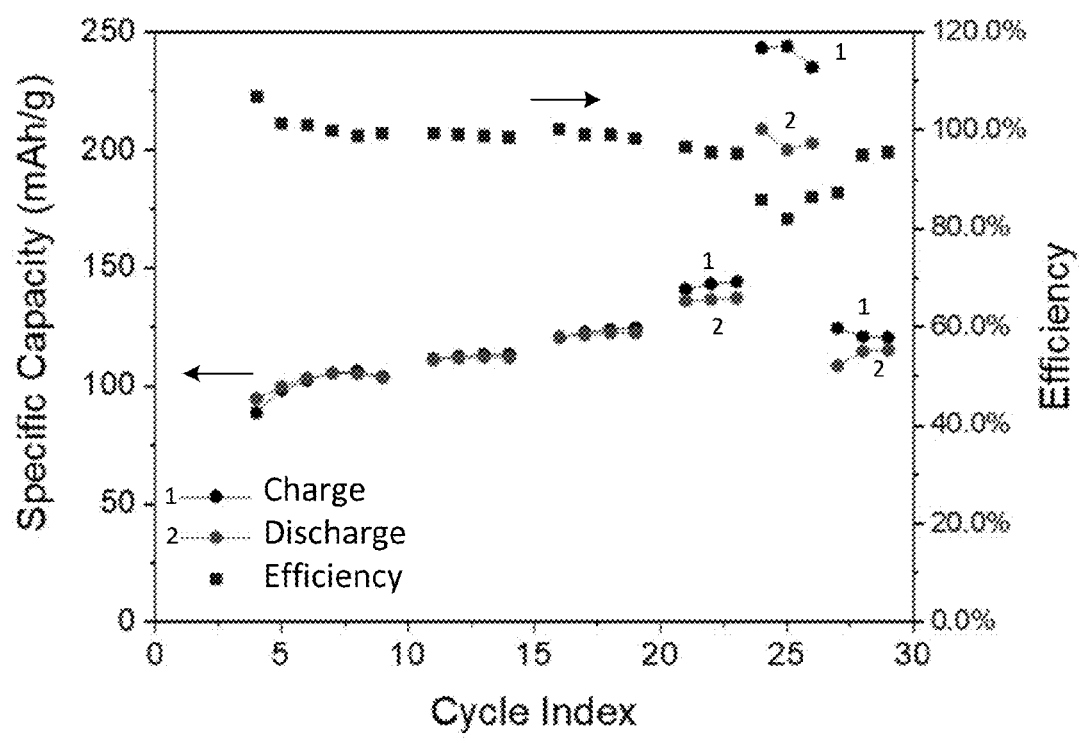
FIGS. 10A-10C show the performance of an Al—Ni battery assembled in a charged state with cathode granules.
Figure 10B:
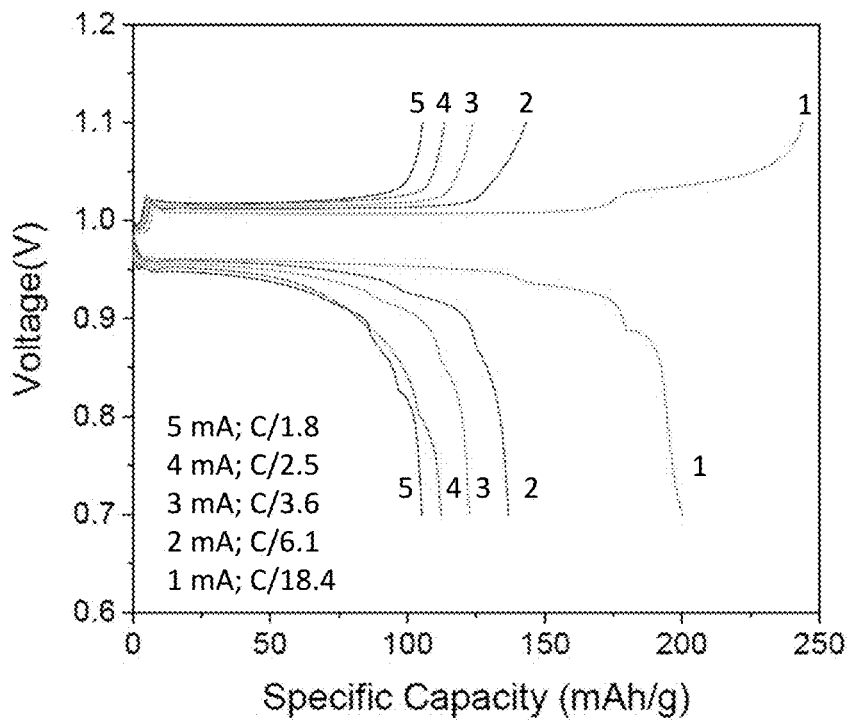
Figure 10C:
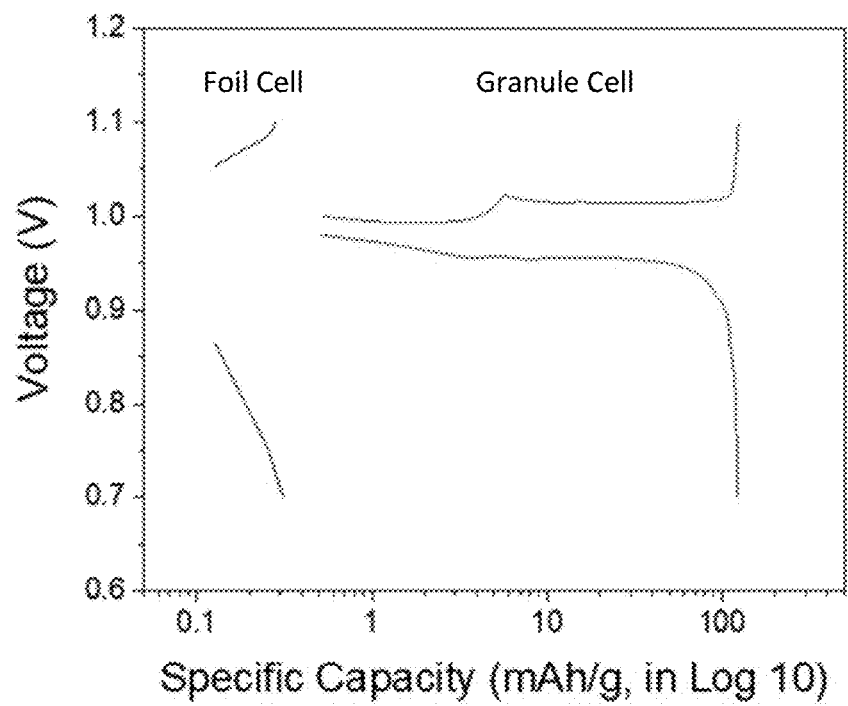
Figure 11A:
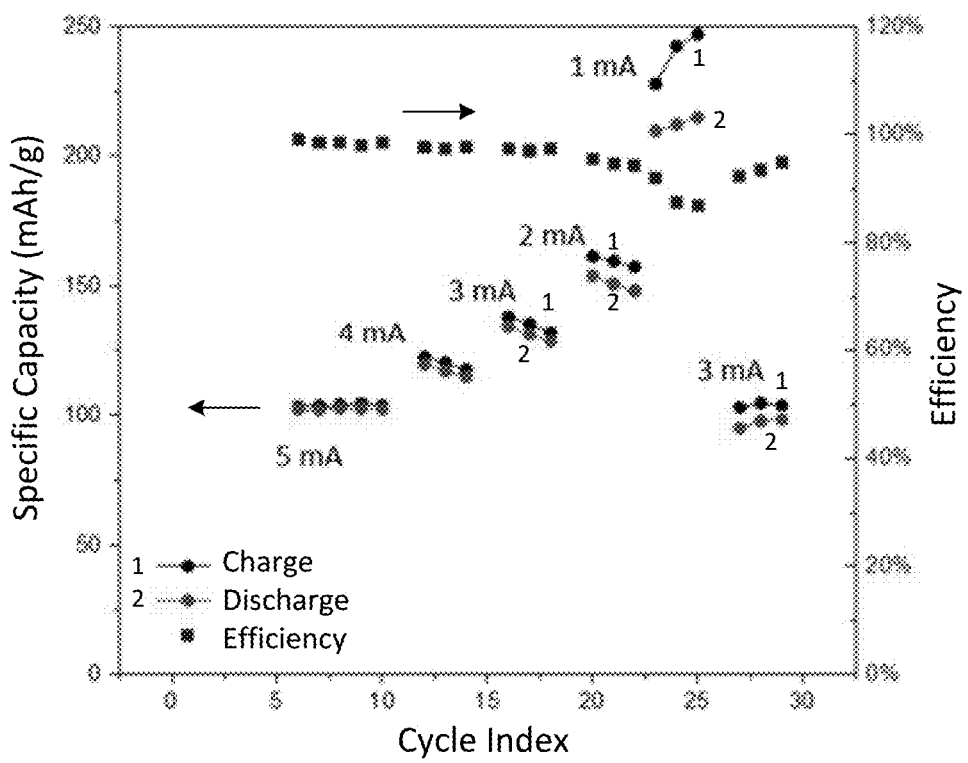
FIGS. 11A and 11B show cycling capacities normalized to nickel mass and corresponding efficiencies for an Al—Ni cell assembled with discharged-state granules and an aluminum anode including 4 stacked pieces of wire cloth (FIG. 11A)
Figure 11B:
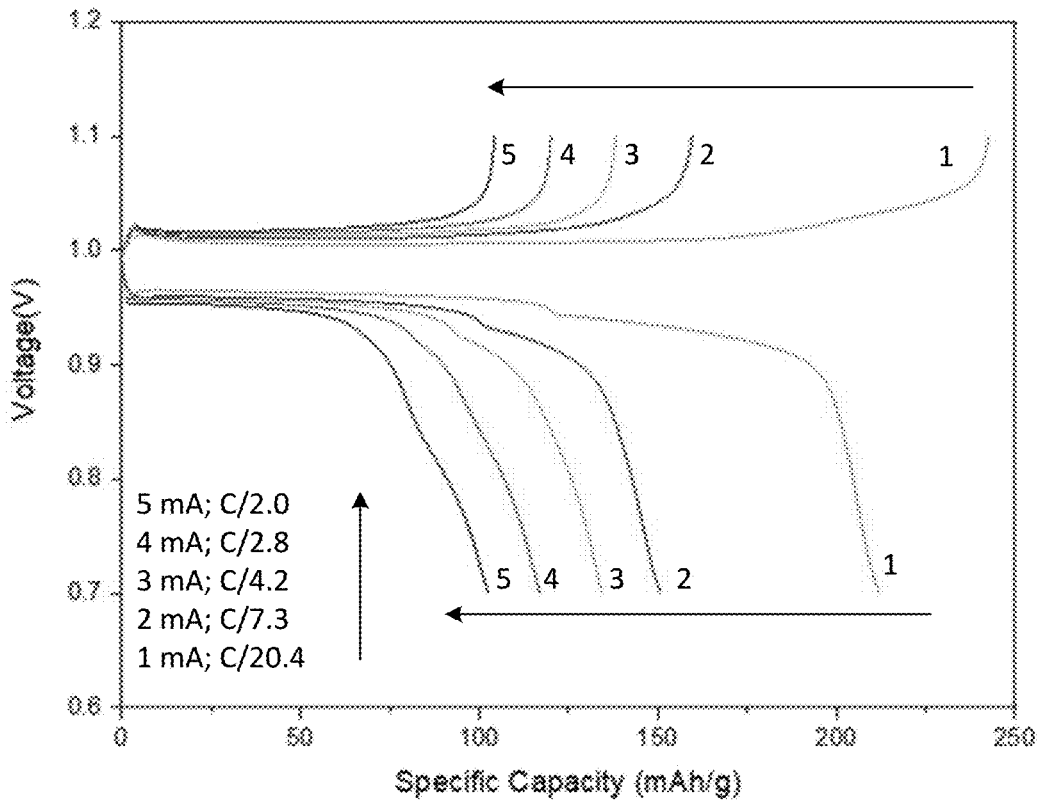

The cell was assembled with a piece of high-surface area aluminum wire cloth (200×200 mesh) and finely ground sodium chloride (>400 mesh) at the anode. The specific discharge capacity for the cell was averaged to be 102 mAh/g at 5 mA (C/1.8), 112 mAh/g at 4 mA (C/2.5), 122 mAh/g at 3 mA (C/3.6), 137 mAh/g (C/6.1), and 204 mAh/g at 1 mA (C/18.4) (FIGS. 10A, 10B). The end cycles at 3 mA were averaged to 112.9 mAh/g with a capacity retention of 92.5%. The utilization of total nickel content in the cell assembled from charged-state granules was up to 22.3% at 1 mA, improving by about two orders of magnitude from the foil configuration (FIG. 9C). The configuration of the cell was not limited by the anode mass or surface area, as quadrupling the pieces of aluminum wire cloth showed rather minimal improvement of the cycling performance when comparing capacities over cycles (FIGS. 10A, 11A) and voltage profiles at different rates (FIGS. 10B, 11B).

The trade-off to the high performance of the cell assembled with a charged-state cathode is its complexity, which can hinder the manufacturing process especially when the goal is to provide cost-efficient storage in large-scale. By both spectroscopic and performance evaluation, removal of surface oxide passivation on the nickel cathode is the key to full utilization. It was hypothesized that a surface treatment might suffice instead of in-situ activation from a Na—$NiCl_2$ cell.

Under a 4% $H_2/N_2$ atmosphere, the nickel granules that supplied the Na—$NiCl_2$ cell were annealed at 650° C. (FIG. 12A), and the surface oxidation was lessened to leave behind a more metallic surface. The XPS spectrum of the nickel powder starting materials shows a set of two peaks at 852.6, and 856 eV in the Ni 2p region (862 eV satellite), which correspond to metallic nickel with a noticeable presence of surface hydroxides at higher binding energies. After sintering, the peak at 856 eV reduced significantly in intensity and the metallic nickel (852.6 eV) became dominant on the surface (FIG. 12B).

Figure 13B:
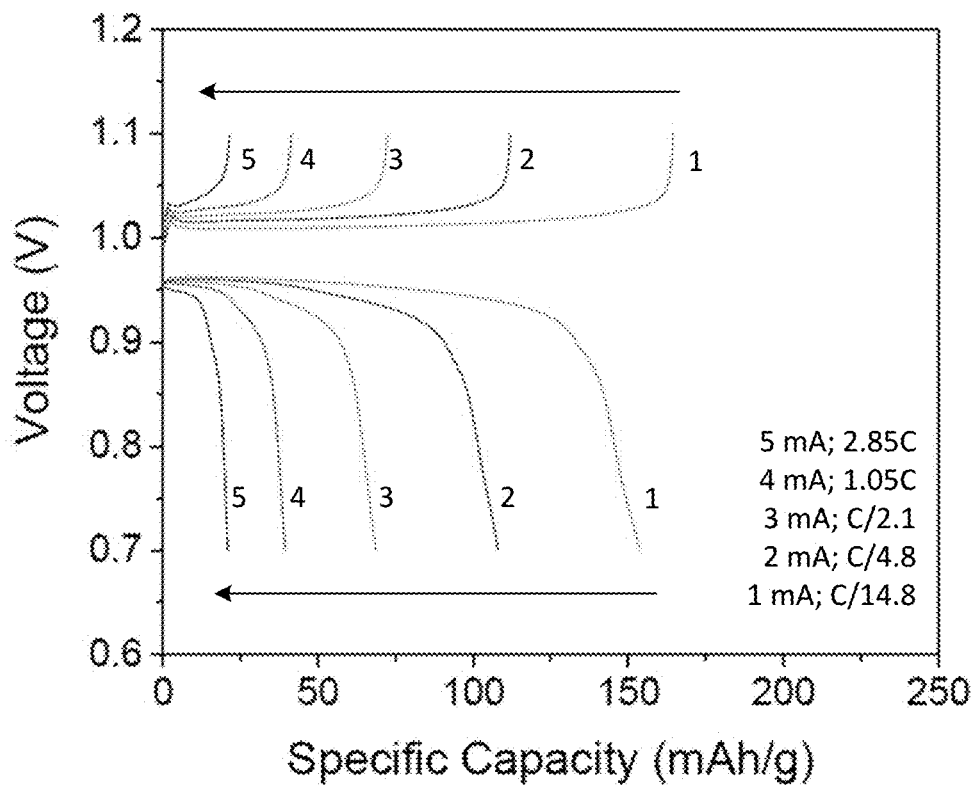
Figure 13C:
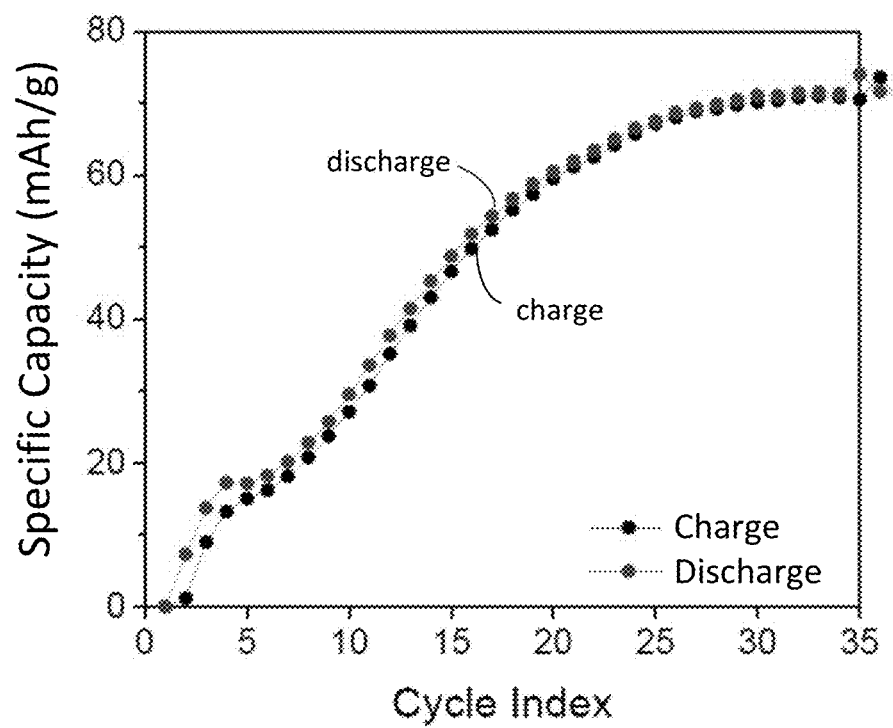

The sintered granules were mixed with molten $NaAlCl_4$ via vacuum infiltration and then thoroughly crushed to produce a fine mixture. The resulting nickel mixture was transplanted into the cathode compartment of an Al—Ni cell, which showed much improved performance than the original foil design. The specific discharge capacity for the cell was 19.0 mAh/g at 5 mA (2.85 C), 41.0 mAh/g at 4 mA (1.05 C), 68.5 mAh/g at 3 mA (C/2.1), 105 mAh/g (C/4.8), and 160. mAh/g at 1 mAh (C/14.8) (FIGS. 13A and 13B). The end cycles at 3 mA are averaged to 63.3 mAh/g with a capacity retention of 92.8%. The utilization of total nickel content in the cell is up to 17.5% at 1 mA. Considering the significant simplification of the cell assembly process, the performance of the cell assembled at the discharged state with sintered granule was promising. There are still a few more optimization steps to parallel the performance of a cell to be assembled at the discharged state. For example, although the cathode surface was theoretically activated, a long initiate activation period was needed for the cell to reach full capacity (FIG. 13C), as a conductive network likely needs to be formed throughout the cathode mass by cycling.

Example 2

Ni—Al Battery with $NaAlCl_4$ Electrolyte and Sulfur

It was discovered that the activation period could be significantly shortened with the introduction of sulfur. Sulfur aids in removing surface passivation on the cathode.

Figure 14A:
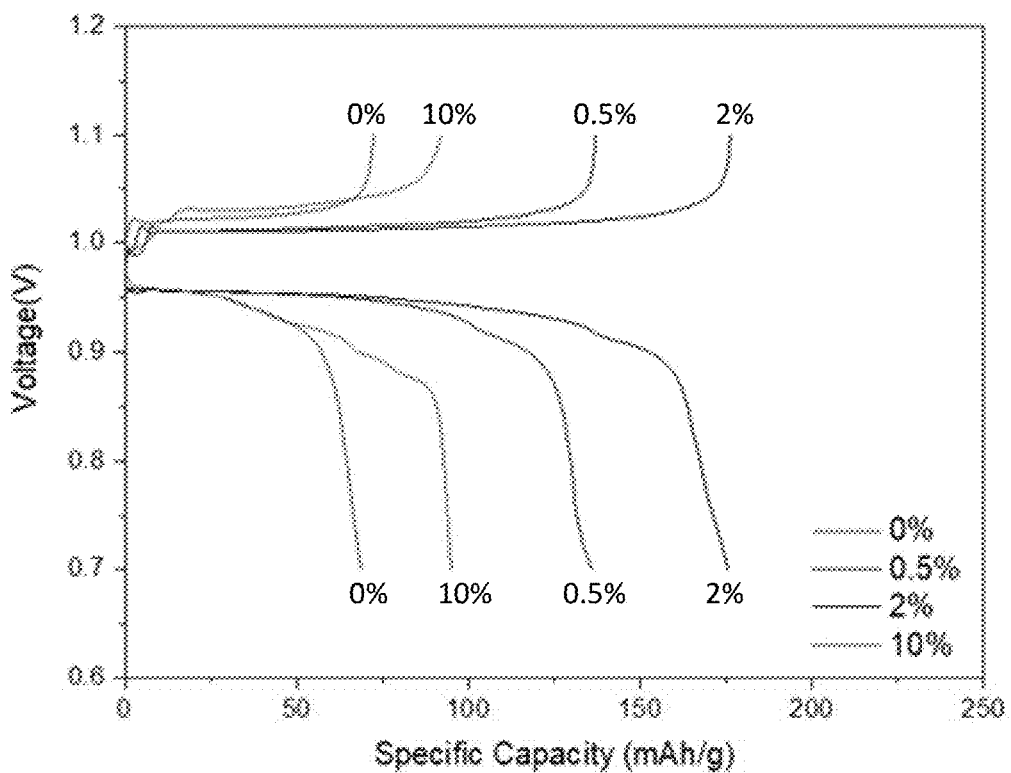
FIGS. 14A-14E show activation of Al—Ni cells assembled in the discharged state with sulfur doping in the electrolyte melt.
Figure 14B:
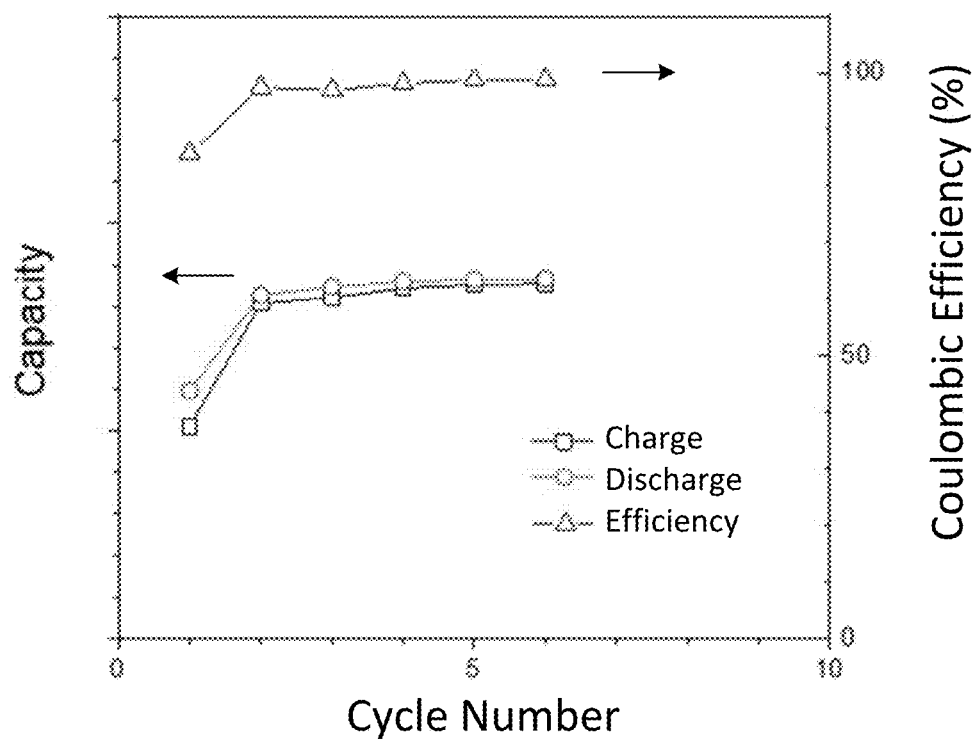
Figure 14C:
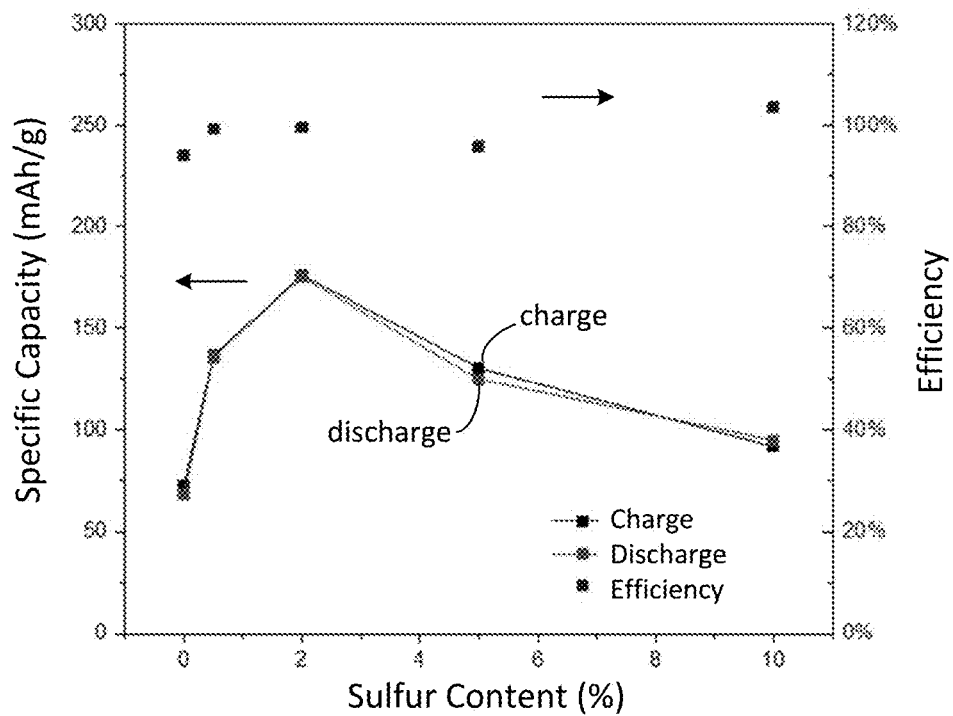
Figure 14D:
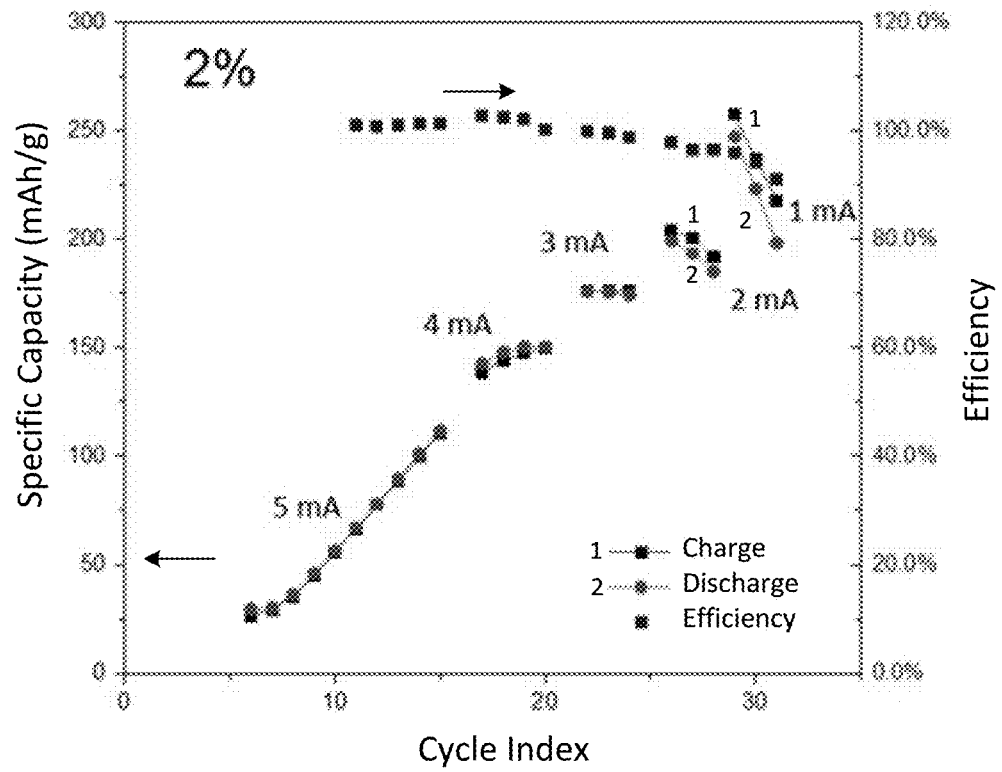
Figure 14E:
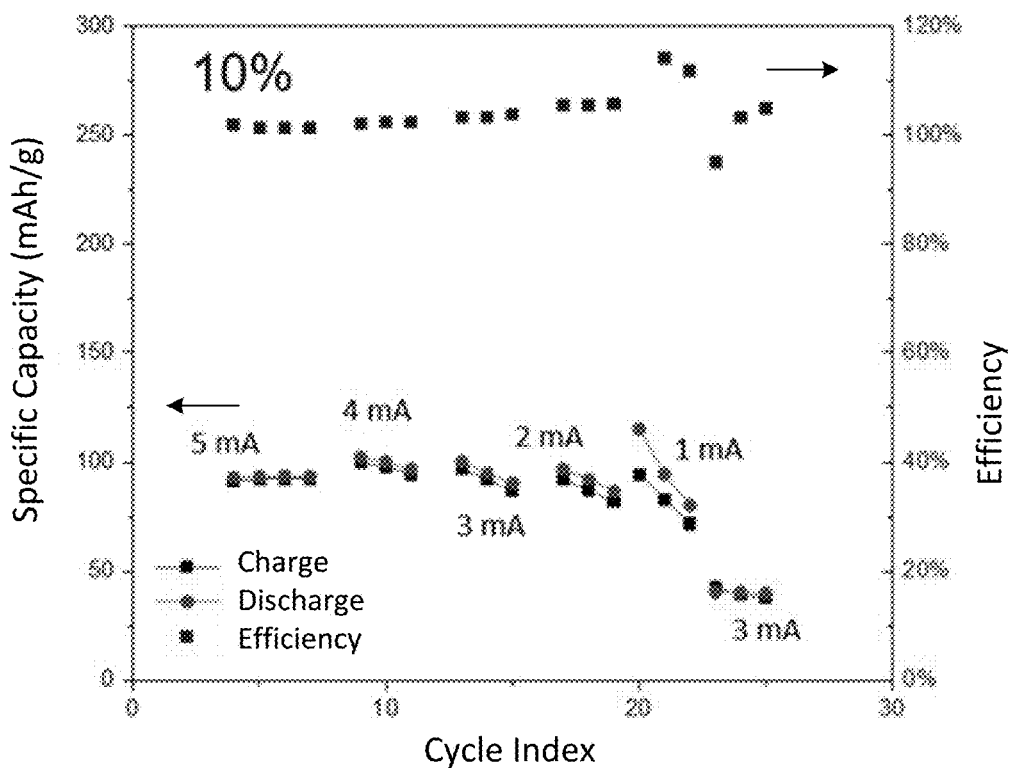

By introducing sulfur to the cell assembled in the discharged state (sulfur was added to the electrolyte melt during cell assembly), the cell was activated to the higher specific capacities within just a few cycles (FIGS. 14A and 14B; the cell in FIG. 14B include 1 mol % S). At 3 mA, the specific discharge capacity of the cell increased to 137 mAh/g with 0.5 mol % S, 176 mAh/g with 2 mol % S, 125 mAh/g with 5 mol % S, and 92.0 mAh/g with 10 mol % S, from the undoped state of 68.5 mAh/g (FIG. 14C). There was clearly an optimal level of sulfur doping as the 10 mol % S cell cycled to lower capacity than the 2 mol % S cell, while initial cycling at 5 mA easily reached stability without prolonged activation (FIGS. 14D and 14E). Considering the 2 mol % S closer to the optimal sulfur doping, the specific discharge capacity for the cell was 148 mAh/g at 4 mA (C/3.4), 175 mAh/g at 3 mA (C/5.4), 193 mAh/g (C/8.9), and 223. mAh/g at 1 mAh (C/20.6). The end cycles at 3 mA were averaged to 63.3 mAh/g with a capacity retention of 92.8%. The transformation from sulfur doping turned cells at limited capacities to the best performing setup investigated during the initial cycling; however, the capacity of the sulfur-doped cell decreased more significantly during the end cycles at 3 mA.

Example 3

Long-Term Cycling of Ni—Al Battery with $NaAlCl_4$ Electrolyte

Figure 15A:
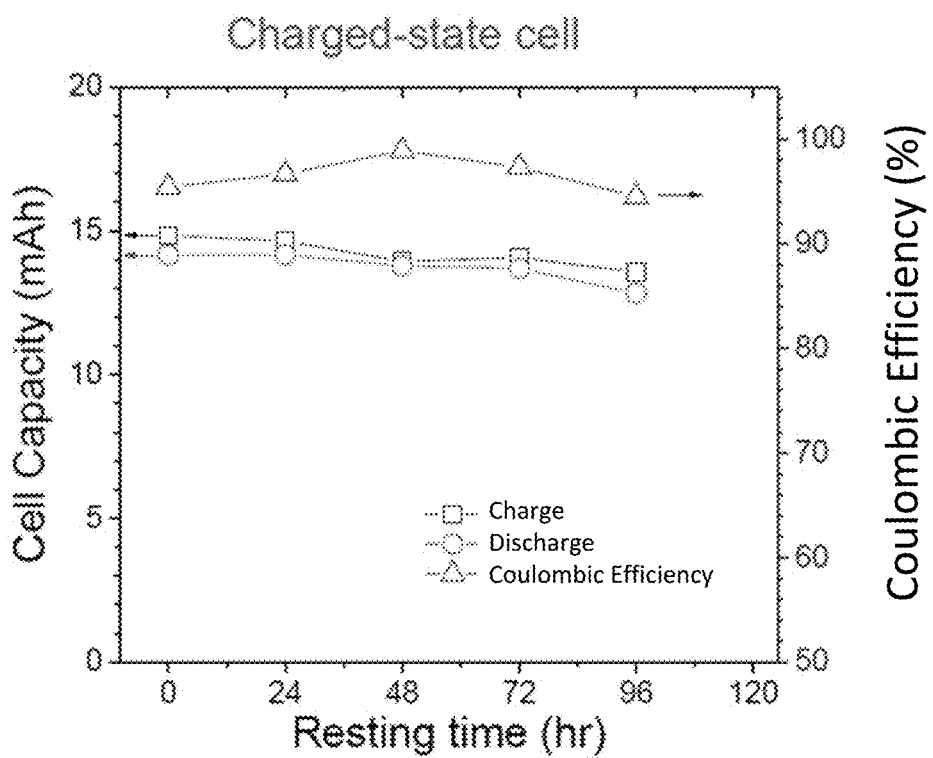
FIGS. 15A and 15B show long-term thermal cycling performance of a Ni—Al cell with $NaAlCl_4$ electrolyte that was assembled in a charged state with resting times of up to 96 hours (FIG. 15A) and over 28 days (FIG. 15B).
Figure 15B:
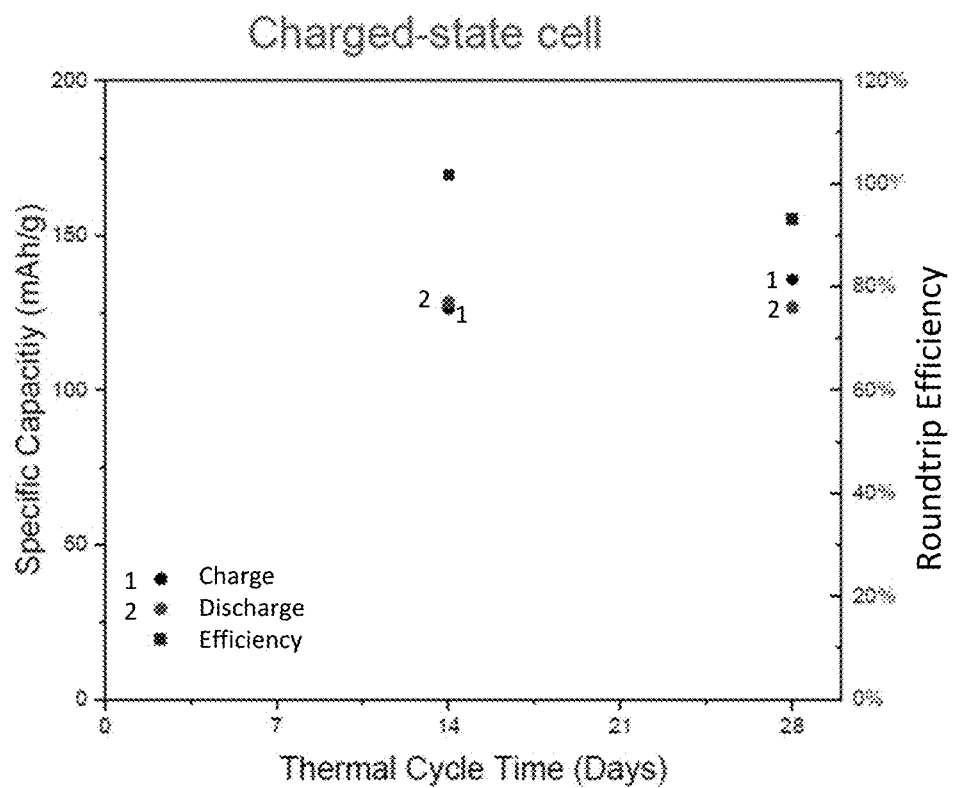
Figure 16:
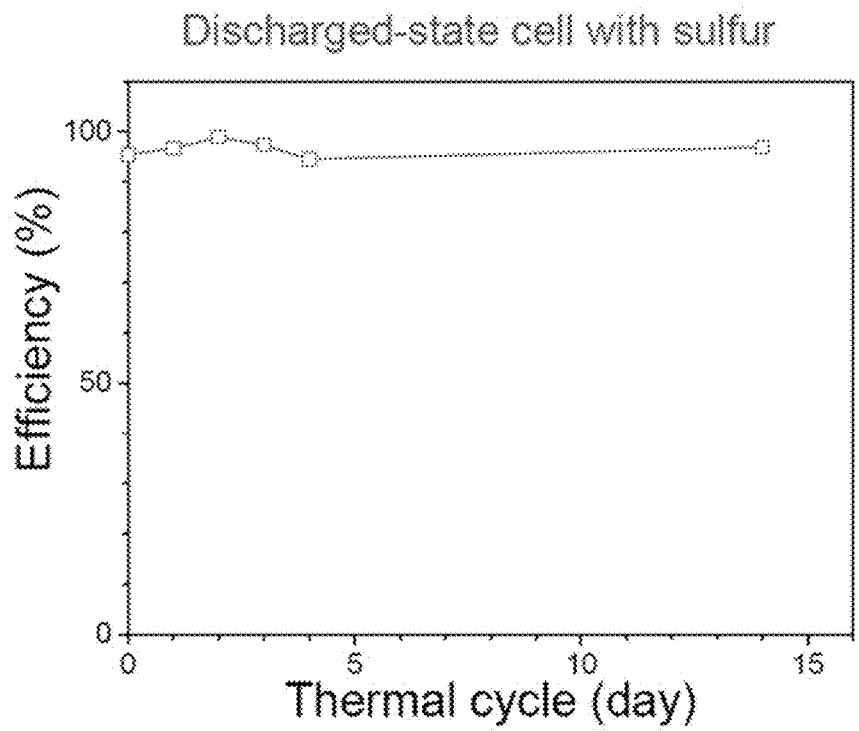
FIG. 16 shows thermal cycling performance of a Ni—Al cell with 1 mol % sulfur (relative to the nickel present in the cathode) and $NaAlCl_4$ electrolyte that was assembled in a charged state over 15 days.

A Ni—Al cell assembled in the charged state (i.e., with a $NiCl_2$ cathode) with $NaAlCl_4$ electrolyte was cycled over several charge-freeze-thaw-discharge cycles to show (thermal cycling) to show these batteries can store energy over a relatively long period of time, up to four weeks, with minimal self-discharge. The cell was charged at 180° C., cooled to room temperature and stored for x hours or days, and then reheated to 180° C. and discharged. FIG. 15A shows the cell capacity and coulombic efficiency with resting times up to 96 hours of a cell assembled at the charged state. Long-term cycling showed that the capacity retention of the cell assembled at the charged state was over 99% with almost no loss after two weeks. In four weeks, the cell assembled at the charged state retained most of its capacity with a daily loss of 0.032 mAh/g or approximately 0.024%, with an overall retention of 93.2% (FIG. 15B). In comparison, a cell assembled at the discharged state from the sintered granules and cycled with the same protocol retained over 99% of the charged capacity over two weeks and 96.5% of the charged capacity over four weeks. The cell assembled at the discharged state with the sintered granules performed at a similar level with the cell at the charged state, highlighting that the simpler preparation is competitive. A cell assembled in the discharged state with 1 mol % sulfur (relative to nickel present in the cathode) present in the electrolyte and cycled with the same protocol retained >95% of the capacity over two weeks (FIG. 16).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A rechargeable battery, comprising:
   a cathode comprising $Ni_yFe_{1-y}$ and $Ni_yFe_{1-y}X_2$, where $0 \leq y \leq 1$;
   an anode comprising Al and MX deposited onto an aluminum current collector;
   a porous separator positioned between the cathode and the anode; and an electrolyte comprising $MAlX_4$, the porous separator impregnated with the electrolyte such that pores of the porous separator are filled with the electrolyte; and greater than 0 mol % and up to 10 mol % sulfur relative to moles of $Ni_yFe_{1-y}$ in the cathode, wherein after 2-5 cycles, the sulfur is present as oxidized sulfur species, wherein M is Na, Li, K, or a combination thereof, and X is Cl, Br, I, or a combination thereof, wherein the anode comprises 50 mol % to 130 mol % MX relative to moles of $Ni_yFe_{1-y}$ in the cathode, and wherein the electrolyte is a molten salt electrolyte that is a solid at temperatures less than 50° C.

2. The rechargeable battery of claim 1, wherein the electrolyte comprises $Na_{a1}Li_{a2}K_{a3}AlCl_{b1}Br_{b2}I_{b3}$, where: a1+a2+a3=1, where 0≤a1≤1, 0≤a2≤1, and 0≤a3≤1; and b1+b2+b3=4, where 0≤b1≤4, 0≤b2≤4, and 0≤b3≤4.

3. The rechargeable battery of claim 1, wherein:
(i) the electrolyte comprises $NaAlCl_4$; or
(ii) the cathode comprises Ni; or
(iii) both (i) and (ii).

4. The rechargeable battery of claim 1, wherein the cathode comprises porous nickel granules having an average size of 0.5 mm to 2 mm.

5. The rechargeable battery of claim 1, further comprising a container containing the cathode, the anode, the porous separator, and the electrolyte, the container comprising:
an upper portion;
a lower portion; and
a compressible gasket between the upper portion and the lower portion.

6. The rechargeable battery of claim 1, wherein:
(i) the electrolyte comprises $NaAlCl_4$; or
(ii) the cathode comprises $NiCl_2$ and Ni; or
(iii) the anode comprises Al and NaCl; or
(iv) any combination of (i), (ii), and (iii).

7. A method, comprising:
storing energy in a rechargeable battery by
providing a rechargeable battery comprising a cathode comprising $Ni_yFe_{1-y}$ and $Ni_yFe_{1-y}X_2$, where 0≤y≤1, an anode comprising Al and MX deposited onto an aluminum current collector, a porous separator positioned between the cathode and the anode, an electrolyte comprising $MAlX_4$, the porous separator impregnated with the electrolyte, and greater than 0 mol % and up to 10 mol % sulfur relative to moles of $Ni_yFe_{1-y}$ in the cathode, wherein after 2-5 cycles, the sulfur is present as oxidized sulfur species, wherein M is Na, Li, K, or a combination thereof, and X is Cl, Br, I, or a combination thereof, wherein the anode comprises 50 mol % to 130 mol % MX relative to moles of $Ni_yFe_{1-y}$ in the cathode, and wherein the electrolyte is a molten salt electrolyte that is a solid at temperatures less than 50° C.;
heating the electrolyte to a temperature $T_1$, wherein the temperature $T_1$ is above a melting point of the electrolyte, thereby melting the electrolyte;
charging the temperature-activated rechargeable battery while maintaining the temperature of the electrolyte at or greater than the temperature $T_1$; and
allowing the electrolyte to cool to a temperature $T_2$, wherein the temperature $T_2$ is below the melting point of the electrolyte, thereby solidifying the electrolyte and storing energy in the temperature-activated rechargeable battery.

8. The method of claim 7, wherein charging the rechargeable battery comprises:
supplying a current to the rechargeable battery, wherein the current is sufficient to create an oxidation-reduction reaction in the electrolyte; and
maintaining the current until the oxidation-reduction reaction reaches a desired cut-off voltage.

9. The method of claim 8, wherein the current is from 1 mA to 5 mA.

10. The method of claim 7, further comprising:
releasing stored energy from the rechargeable battery by
heating the electrolyte to a temperature $T_3$, wherein the temperature $T_3$ is above a melting point of the electrolyte, thereby melting the electrolyte, and
discharging the rechargeable battery while maintaining the temperature of the electrolyte at or greater than the temperature $T_3$, thereby releasing some or all of the stored energy from the temperature-activated rechargeable battery.

11. The method of claim 7, wherein:
the electrolyte comprises $NiAlCl_4$;
the temperature $T_1$ is greater than 160° C.; and
the temperature $T_2$ is less than 150° C.

12. The method of claim 7, wherein the temperature $T_2$ is ambient temperature.

13. The method of claim 7, wherein the rechargeable battery, when maintained at or below the temperature $T_2$, has:
(i) a capacity retention of at least 99% of an initial charged capacity after two weeks; or
(ii) a capacity retention of at least 95% of an initial charged capacity after four weeks; or
(iii) both (i) and (ii).

14. A method of making a rechargeable battery, the method comprising:
sintering cathode material particles to remove surface oxidation and produce porous granules, the granules comprising $Ni_yFe_{1-y}$ where 0≤y≤1;
combining the granules with molten $MAlX_4$, wherein M is Na, Li, K, or a combination thereof, and X is Cl, Br, I, or a combination thereof to provide a $Ni_yFe_{1-y}$/$MAlX_4$ mixture;
placing a porous separator on an upper surface of the $Ni_yFe_{1-y}$/$MAlX_4$ mixture;
placing additional $MAlX_4$ combined with greater than 0 mol % to 10 mol % sulfur, relative to moles of the $Ni_yFe_{1-y}$, on the porous separator;
melting the additional $MAlX_4$, thereby impregnating the porous separator with the additional $MAlX_4$ such that pores of the porous separator are filled with the $MAlX_4$;
placing an aluminum current collector on an upper surface of the porous separator while the $MAlX_4$ is molten;
cooling the $MAlX_4$ to solidify the $MAlX_4$, wherein the $MAlX_4$ is a molten salt electrolyte that is a solid at temperatures less than 50° C.;
activating the cathode by
heating the $MAlX_4$ to a temperature above a melting point of the $MAlX_4$, thereby melting the $MAlX_4$, and
cycling the rechargeable battery while maintaining the temperature of the electrolyte above the melting point of the $MAlX_4$ for 2-40 cycles, wherein after 2-5 cycles, the sulfur is present as oxidized sulfur species; and
at least partially charging the rechargeable battery, whereby the cathode further comprises $Ni_yFe_{1-y}X_2$, the anode further comprises Al and MX deposited onto the aluminum current collector, where the anode comprises 50 mol % to 130 mol % MX relative to moles of $Ni_yFe_{1-y}$ in the cathode.

15. The method of claim 14, wherein the granules are combined with molten $MAlX_4$ in a container, the method further comprising:
- (i) evacuating gas from the container containing granules and molten $MAlX_4$; or
- (ii) applying pressure to the porous separator to remove gas from pores of the porous separator while impregnating the porous separator with the additional $MAlX_4$; or
- (iii) both (i) and (ii).

16. The method of claim 14, further comprising, prior to placing the porous separator on the upper surface of the $Ni_yFe_{1-y}/MAlX_4$ mixture:
- cooling the $Ni_yFe_{1-y}/MAlX_4$ mixture to solidify the molten $MAlX_4$; and
- comminuting the $Ni_yFe_{1-y}/MAlX_4$ mixture to provide grounds having an average size of 0.1 to 2 mm.

\* \* \* \* \*